(12) United States Patent
Pietrobon et al.

(10) Patent No.: US 11,043,117 B2
(45) Date of Patent: Jun. 22, 2021

(54) METHOD AND APPARATUS FOR NEXT TOKEN PREDICTION BASED ON PREVIOUSLY OBSERVED TOKENS

(71) Applicant: HERE GLOBAL B.V., Eindhoven (NL)

(72) Inventors: Davide Pietrobon, Berkeley, CA (US); Andrew Lewis, Berkeley, CA (US); Jane MacFarlane, Oakland, CA (US); Robert Berry, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 238 days.

(21) Appl. No.: 15/993,204

(22) Filed: May 30, 2018

(65) Prior Publication Data

US 2018/0350232 A1 Dec. 6, 2018

Related U.S. Application Data

(60) Provisional application No. 62/513,232, filed on May 31, 2017.

(51) Int. Cl.
*G08G 1/01* (2006.01)
*G06F 16/29* (2019.01)
(Continued)

(52) U.S. Cl.
CPC .......... *G08G 1/0129* (2013.01); *G06F 16/29* (2019.01); *G06K 9/6218* (2013.01); *G06Q 10/04* (2013.01); *G06Q 50/30* (2013.01); *G08G 1/0133* (2013.01)

(58) Field of Classification Search
CPC .................................................... G08G 1/129
See application file for complete search history.

(56) References Cited

U.S. PATENT DOCUMENTS 7,161,497 B2 * 1/2007 Gueziec ................. G01C 21/26
340/905
7,221,287 B2 * 5/2007 Gueziec ................. H04W 4/029
340/905
(Continued)

OTHER PUBLICATIONS

NPL, Aphrodite Galata, Modeling Interaction Using Learnt Qualitative Spatio-Temporal Relations and Variable Length Markov Models, Proceedings of the European Conference on Artificial Intelligence (ECAI'02), Lyon, 2002 (Year: 2002).*
(Continued)

*Primary Examiner* — Jean Paul Cass
(74) *Attorney, Agent, or Firm* — Ditthavong, Steiner & Mlotkowski

(57) ABSTRACT

An approach is provided for next token prediction based on previously observed tokens. The approach involves receiving an observed time series of tokens, wherein each of the tokens represents an observed data pattern. The approach also involves adding a most recent token from the observed time series of tokens into a variable token set. The approach further involves processing a historical token set to determine a historical token sequence comprising the variable token set followed by a next token. The approach further involves recursively adding a next most recent token from the observed time series of tokens into the variable token set for processing until the next token following the variable token set in the determined historical token sequence is unique or meets a target number of possible predictions. The approach further involves presenting the next token as a predicted next token of the observed time series of tokens.

20 Claims, 21 Drawing Sheets

(51) Int. Cl.
  *G06Q 50/30* (2012.01)
  *G06Q 10/04* (2012.01)
  *G06K 9/62* (2006.01)

(56) References Cited

U.S. PATENT DOCUMENTS

| | | | | |
|---|---|---|---|---|
| 9,633,560 | B1* | 4/2017 | Gao | G08G 1/0145 |
| 9,965,951 | B1* | 5/2018 | Gallagher | G08G 1/0133 |
| 10,005,464 | B2* | 6/2018 | Toyoda | B60W 10/20 |
| 10,074,272 | B2* | 9/2018 | Bernhardt | H04L 67/12 |
| 10,114,375 | B1* | 10/2018 | Wei | G08G 1/166 |
| 10,210,755 | B1* | 2/2019 | Franco | G08G 1/096716 |
| 10,297,151 | B2* | 5/2019 | Miller | G08G 1/052 |
| 10,497,261 | B2* | 12/2019 | Kim | G08G 1/096716 |
| 2005/0159851 | A1* | 7/2005 | Engstrom | G06K 9/00335 |
| | | | | 701/1 |
| 2005/0278112 | A1* | 12/2005 | Gem | B60W 40/06 |
| | | | | 701/532 |
| 2008/0046134 | A1* | 2/2008 | Bruce | G06Q 10/047 |
| | | | | 701/1 |
| 2010/0063715 | A1* | 3/2010 | Wynter | G01C 21/3691 |
| | | | | 701/118 |
| 2010/0076675 | A1* | 3/2010 | Barth | G01C 21/3469 |
| | | | | 701/532 |
| 2010/0299058 | A1* | 11/2010 | Nortrup | G08G 1/0129 |
| | | | | 701/532 |
| 2011/0137557 | A1* | 6/2011 | de los Reyes | G08G 1/012 |
| | | | | 701/532 |
| 2011/0288769 | A1* | 11/2011 | Gudat | G01C 21/343 |
| | | | | 701/532 |
| 2014/0163876 | A1* | 6/2014 | Fuchs | G01C 21/3492 |
| | | | | 701/532 |
| 2014/0201126 | A1* | 7/2014 | Zadeh | A61B 5/165 |
| | | | | 706/52 |
| 2014/0214318 | A1* | 7/2014 | Johansson | G09B 29/006 |
| | | | | 701/532 |
| 2015/0268054 | A1* | 9/2015 | Stankoulov | G01C 21/3697 |
| | | | | 701/123 |
| 2016/0123748 | A1* | 5/2016 | Chidlovskii | G01C 21/3453 |
| | | | | 701/410 |
| 2016/0170996 | A1* | 6/2016 | Frank | G06F 16/24578 |
| | | | | 707/748 |
| 2016/0224803 | A1* | 8/2016 | Frank | G06F 16/24578 |
| 2016/0247397 | A1 | 8/2016 | Bo et al. | |
| 2016/0300150 | A1 | 10/2016 | Watts-Fitzgerald et al. | |
| 2016/0300252 | A1* | 10/2016 | Frank | G06F 16/24578 |
| 2016/0360336 | A1* | 12/2016 | Gross | H04M 1/72403 |
| 2016/0360382 | A1* | 12/2016 | Gross | G06F 9/445 |
| 2018/0204111 | A1* | 7/2018 | Zadeh | G06K 9/3233 |

OTHER PUBLICATIONS

Office Action for corresponding European Patent Application No. 18175232.0-1217, dated Aug. 14, 2018, 10 pages.
Galata et al., "Modeling Interaction Using Learnt Qualitative Spatio-Temporal Relations and Variable Length Markov Models," Appears in Proceedings of the European Conference on Artificial Intelligence (ECAI'02), Lyon, 2002, pp. 1-5.
Fhwa, "Road Weather Management Program—Frequently Asked Questions", Feb. 1, 2017, web page retrieved on Aug. 30, 2018 from https://ops.fhwa.dot.gov/weather/faq.htm, pp. 1-2.
Ncei, "Land-Based Station Data", web page retrieved on Aug. 30, 2018 from https://www.ncdc.noaa.gov/data-access/land-based-station-data, pp. 1-2.
Office Action for corresponding European Patent Application No. 18 175 232.0-1213, dated Feb. 26, 2020, 9 pages.

* cited by examiner

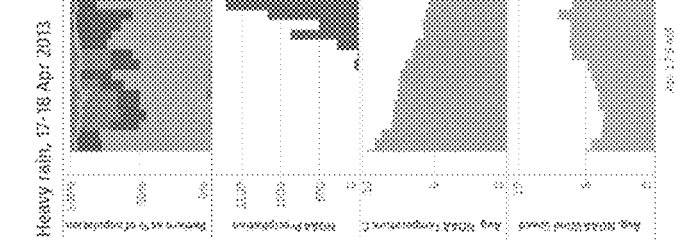
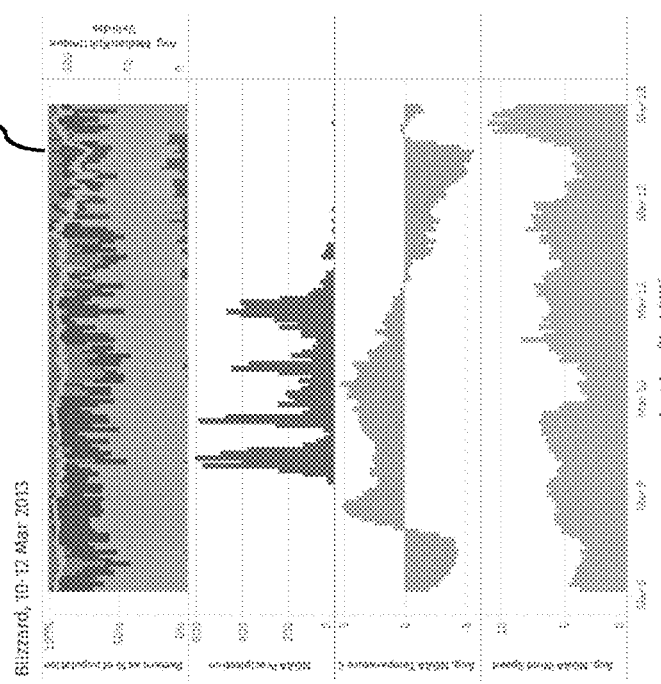
FIG. 8K
FIG. 8L

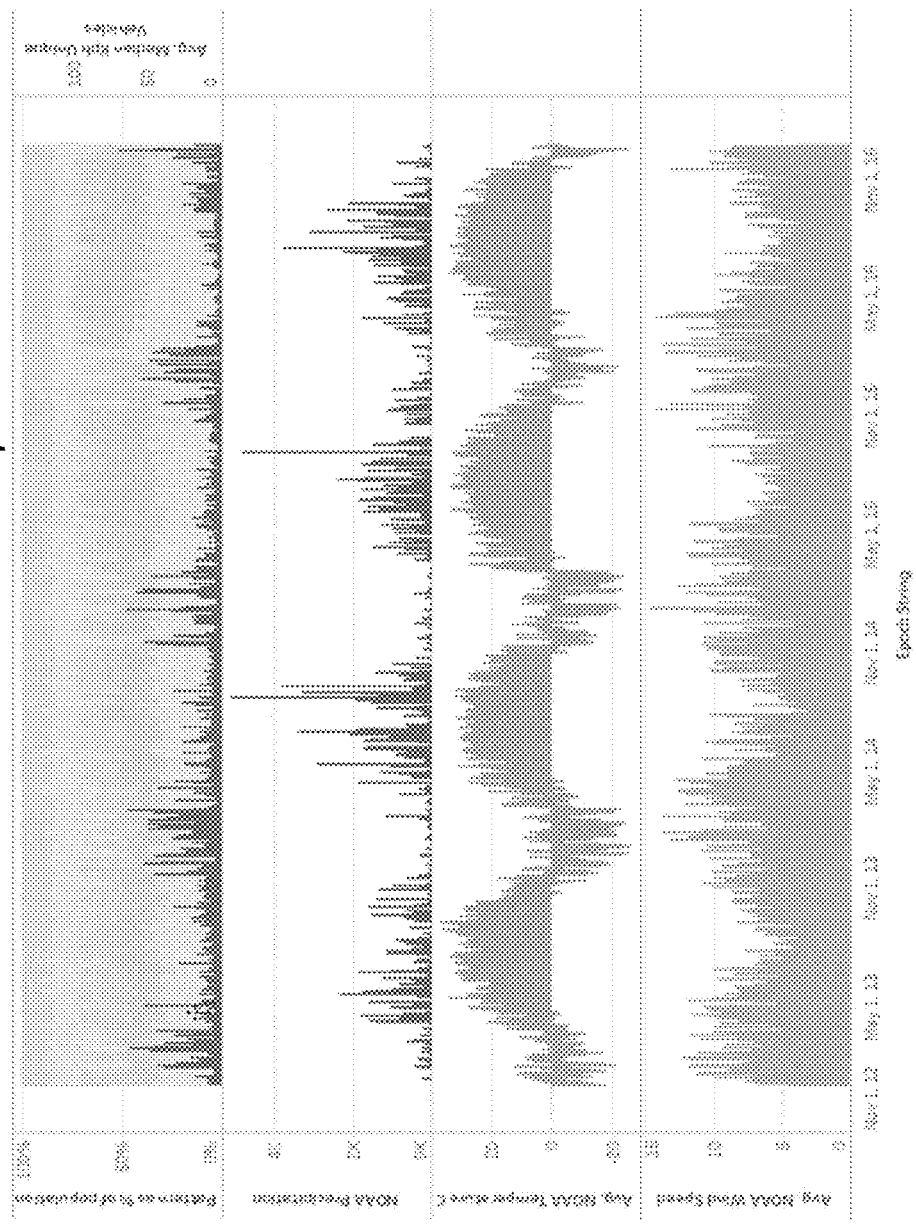

METHOD AND APPARATUS FOR NEXT TOKEN PREDICTION BASED ON PREVIOUSLY OBSERVED TOKENS

CROSS-REFERENCES TO RELATED APPLICATIONS

This application claims priority from U.S. Provisional Application Ser. No. 62/513,232, entitled "METHOD AND APPARATUS FOR NEXT TOKEN PREDICTION BASED ON PREVIOUSLY OBSERVED TOKENS," and filed May 31, 2017, the contents of which are hereby incorporated herein in their entirety by this reference.

BACKGROUND

Mapping-related service providers (e.g., map data providers, navigation service providers, etc.) face significant technical challenges when making future traffic predictions for a given road network. Historically, such traffic predictions generally rely on historical traffic data that are tagged with detailed knowledge of significant events that might be impacting traffic states (or patterns) on a road link of interest. One type of representation of traffic data (and/or any other type of data) is a token-based representation. Of particular interest among mapping-related service providers is predicting as accurately as possible the next token or tokens in a time series (of a semi-periodic signal), by looking at the recent history. However, in some applications, it may not be known a priori that the next token or tokens is the best choice based on one static snapshot of the recent history.

SOME EXAMPLE EMBODIMENTS

Therefore, there is a need for an approach for providing a next token prediction using a dynamic or variable number of previously observed tokens.

According to one embodiment, a computer implemented method for next token prediction comprises receiving an observed time series of tokens. Each of the tokens represents an observed data pattern. The method also comprises adding a most recent token from the observed time series of tokens into a variable token set. The method further comprises processing a historical token set to determine a historical token sequence comprising the variable token set followed by a next token. The method further comprises recursively adding a next most recent token from the observed time series of tokens into the variable token set for processing until the next token following the variable token set in the determined historical token sequence is unique or meets a target number of possible predictions. The method further comprises presenting the next token as a predicted next token of the observed time series of tokens.

According to another embodiment, an apparatus for next token prediction comprises at least one processor, and at least one memory including computer program code for one or more computer programs, the at least one memory and the computer program code configured to, with the at least one processor, cause, at least in part, the apparatus to receive an observed time series of tokens. Each of the tokens represents an observed data pattern. The apparatus is further caused to add a most recent token from the observed time series of tokens into a variable token set. The apparatus if further caused to process a historical token set to determine a historical token sequence comprising the variable token set followed by a next token. The apparatus is caused to recursively add a next most recent token from the observed time series of tokens into the variable token set for processing until the next token following the variable token set in the determined historical token sequence is unique or meets a target number of possible predictions. The apparatus is further caused to present the next token as a predicted next token of the observed time series of tokens.

According to another embodiment, a computer-readable storage medium for next token prediction carries one or more sequences of one or more instructions which, when executed by one or more processors, cause, at least in part, an apparatus to receive an observed time series of tokens, wherein each of the tokens represents an observed data pattern. Each of the tokens represents an observed data pattern. The apparatus is further caused to add a most recent token from the observed time series of tokens into a variable token set. The apparatus if further caused to process a historical token set to determine a historical token sequence comprising the variable token set followed by a next token. The apparatus is caused to recursively add a next most recent token from the observed time series of tokens into the variable token set for processing until the next token following the variable token set in the determined historical token sequence is unique or meets a target number of possible predictions. The apparatus is further caused to present the next token as a predicted next token of the observed time series of tokens.

According to another embodiment, an apparatus for next token prediction comprises means for receiving an observed time series of tokens, wherein each of the tokens represents an observed data pattern. Each of the tokens represents an observed data pattern. The apparatus also comprises means for adding a most recent token from the observed time series of tokens into a variable token set. The apparatus further comprises a means for processing a historical token set to determine a historical token sequence comprising the variable token set followed by a next token. The apparatus further comprises a means for recursively adding a next most recent token from the observed time series of tokens into the variable token set for processing until the next token following the variable token set in the determined historical token sequence is unique or meets a target number of possible predictions. The apparatus also comprises a means for presenting the next token as a predicted next token of the observed time series of tokens.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing next token prediction based on previously observed tokens are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
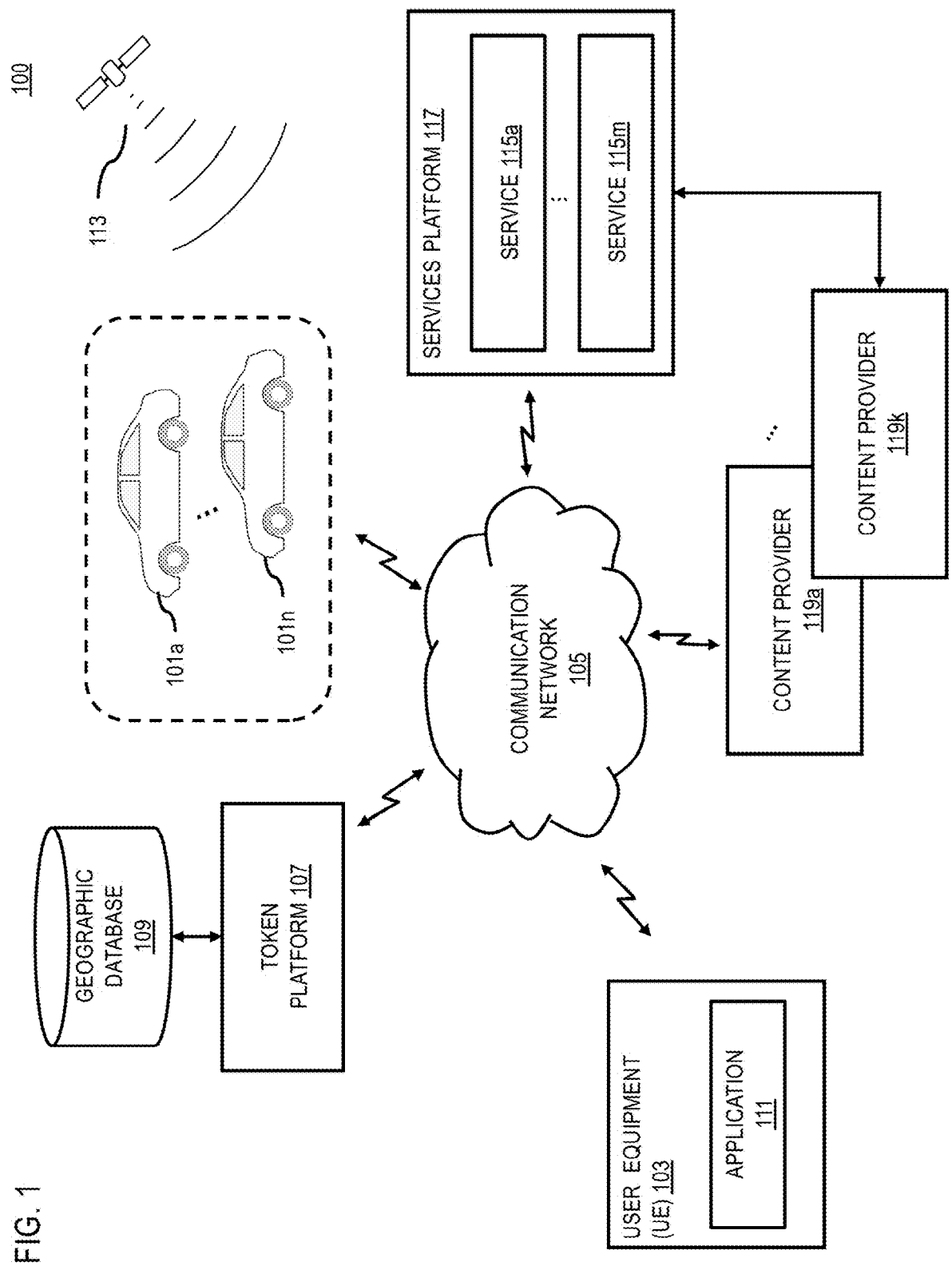
FIG. 1 is a diagram of a system capable providing a next token prediction using a dynamic number of previously observed tokens, according to one embodiment.

FIG. 1 is a diagram of a system capable of providing a next token using a dynamic number of previously observed tokens. As discussed above, many current approaches to token prediction aim to predict as accurately as possible the next token or tokens in a time series (of a semi-periodic signal), by looking at the recent history. The predictions are often based on a corpus of historic data with the assumption that tokens that tend to appear in a given sequence in the past data will be likely to appear in the same sequence in the future. For example, in Natural Language Processing (NLP), computers may wish to anticipate the next letter or next word that will be typed by a user. Typically, in NLP, a fixed number of tokens are used to build the probability distribution of common sequences and then to predict that token that is most likely to follow an observed sequence. That is, a dictionary is built up of all past sequences of n tokens, for a fixed n chosen in advance. Based on such ensemble, a probability of the next tokens is derived by looking at the n-tuple model previously built. By construction, the next token is known with a given probability.

However, the disadvantage of this prediction method is that it may not be known a priori what the best choice of n is, or a single of n may not be optimal in all instances. For example, there may be some cases where knowing just one previous token already determines the next token, and other cases where it is necessary to look at a longer sequence of history in order to make the best prediction. It is possible that more than one token has the same likelihood to follow the observed sequence.

To address this problem, a system 100 FIG. 1 introduces the capability to provide a next token prediction using a dynamic number of previously observed time series tokens. The embodiments of the system 100 described herein, for instance, advantageously enable a next token prediction by looking back at the previous ones far enough that a unique prediction is found given a sequence of tokens at a certain time. The system 100, for instance, builds up a dictionary of observed n-tuples of tokens for all n up to a predetermined point in time. Then, when making a prediction, the system 100 starts by seeing if only the previous token is sufficient to make a unique prediction of the next token. If not the system 100 examines the previous two tokens, and so on, until the system finds an n for which the next token is uniquely determined. In other words, the system 100 uses a variable number n of previously observed tokens to predict the next token or tokens that are likely to occur in the set by evaluating a minimum n number of historical tokens until one or more conditions are met. These conditions can include but are limited to: (1) an n number of previously observed tokens that yields a unique prediction of the next token; (2) an n number of previously observed tokens that results in a target number of possible predictions (e.g., output 2, 3, etc. alternative possible predicted next tokens; and/or (3) a maximum n number of previously observed tokens has been reached (e.g., no more previously observed tokens remain in the observed set to yield a unique next token prediction).

In one embodiment, the system 100 receives an observed time series of tokens. In one embodiment, the series of tokens represents a sequence of tokens at a certain time (i.e., a time series). For example, the tokens may represent sequences of traffic conditions (or patterns) associated with fixed periods of time on a given link (e.g., a highway). More specifically, in this example, the tokens may represent the movement of vehicles (global position system (GPS) probe data) throughout a study area (e.g., a series of roadways) (the "traffic"). It is noted that although the various embodiments are discussed with respect to tokens that represent traffic patterns, it is contemplated that the tokens may be used to represent any pattern, condition, state, etc. that can be predicted based on a variable number of past observations (e.g., weather patterns). In other words, the series of tokens may also represent any situation wherein tokens within a time series have the property that the next token may be determined by the token or tokens that have proceeded it. In one embodiment, the system 100 assumes that the existence of certain sequences in the past makes it likely that similar sequences will also appear in the future.

In one embodiment, the system 100 adds a most recent token from the observed time series of tokens into a variable token set. A variable token set refers, for instance, to a token set that can have a variable number of tokens (e.g., variable with respect to token size or length). In one embodiment, the system 100 adds the most recent token from the observed time series of tokens to the variable token set in an n-tuple number of tokens. As discussed above, a disadvantage of NLP is that a fixed number of tokens are typically used to build the probability distribution of common sequences and then to predict the token that is most likely to follow an observed sequence. However, it may not be known a priori what the best choice of n is, or a single choice of n may not be optimal for all instances. Therefore, in one embodiment, the system 100 advantageously uses a variable length of the history, namely variable n observed tokens to uniquely determine the next token. In one embodiment, the system 100 enforces a minimum density for the historical token sequences against which the variable token set. For example, the system 100 can process historical tokens sequences to build up a dictionary of historical or previously observed n-tuples of tokens. These n-tuples of tokens (e.g. historical token sequences) should have a minimum density or minimum number of tokens (e.g., at least two). In this way, the historical token sequence in the dictionary will have a minimum of at least one token to match against the variable token set being analyzed and a next token that has been observed to follow the matched token or token sequence.

In one embodiment, the system 100 processes the historical token set to determine a historical token sequence comprising the variable token set (e.g., $T_{n-1}$, $T_n$) followed by a next token (e.g., token "X"). In one embodiment, the historical token set comprises at least the observed time series of tokens, tokenized data collected over a period of time, or a combination thereof. In one embodiment, the system 100 processes the historical token set by comparing or attempting to match the variable token set (e.g., $T_{n-1}$, $T_n$) and the next token (e.g., token "X") among the historical token set. In one embodiment, the historical token sequence comprises the variable token set followed by the next token (e.g., $T_{n-1}$, $T_n$, X).

In one embodiment, after processing the historical token set, the system 100 determines that the determined historical token sequence is unique or meets a target number of possible predictions. In one embodiment, the system 100 determines that the next token is unique if it determines that there is only one historical token sequence that includes the variable token set followed by the next token. More specifically, the "only one" may comprise just one instance or it may comprise a number of instances. In one embodiment, if the system 100 determines that the historical token sequence is not unique or does not meet a target number of possible predictions (as discussed more fully below), then the system 100 recursively adds a next most recent token from the observed time series of tokens into the variable token set until the historical token sequence is unique or meets a target number of possible predictions. For example, if the first variable token set is $T_{n-1}$ and $T_n$, then the system 100 can add the most recent token from the observed time series of tokens (e.g., $T_{n-2}$) into the variable token set ($T_{n-2}$, $T_{n-1}$, $T_n$) and then process the historical set as described above. In one embodiment, this process continues until the system 100 determines that the historical token sequence is unique or meets a target number of possible predictions or the system 100 runs out of observed time series of tokens to add to the variable token set.

In one embodiment, wherein the system 100 determines that the next token of the historical token sequence (e.g., $T_{n-1}$, $T_n$, X) is unique, the system 100 presents the token "X" as the predicted next token of the observed time series of tokens. As used herein, a time series of tokens is a sequence of times arranged chronologically by the time (e.g., forward or backwards in time) at which the pattern or condition represented by the token is observed. In an embodiment where in the time series increases chronologically, the next token prediction can represent a prediction of a future pattern. Conversely, in an embodiment where the time series decreases chronologically, the next token prediction can represent a prediction of a past prediction (e.g., predicting an unknown past traffic pattern based on known observations). By way of example, the tokens $T_{n-1}$ and $T_n$ may represent a steady of stream of increasing traffic for a particular day and time on a particular link (e.g., a highway) and the system 100 may determine that the historical token sequence comprising the variable token set ($T_{n-1}$ and $T_n$) and the next token "X" (e.g., representing more traffic than $T_n$) are unique. Consequently, the system 100 will present the token "X" as the predicted next token of the observed time series (i.e., predicting increased traffic relative to $T_{n-1}$ and $T_n$).

In one embodiment, the system 100 can determine that the next token meets a target number of possible predictions rather than determining that the next token is unique by first determining a count of the historical token sequences that include the variable token set and next tokens. In other words, the system 100 can be configured to output any number of possible next token predictions as opposed to just one unique token or token set. In this way, the system 100 can be configured to use an n number of previously observed tokens that will result in producing the target number of possible predictions. For example, in a use case where the target number of possible predictions is two (e.g., instead of one which is the case with a unique prediction is desired), the system 100 increase the size of the variable token until there are only two next possible next token predictions (e.g., the system 100 finds one historical token sequence includes the variable token set followed by the token "X", an another historical token sequence includes the variable token set followed by the token "Y", with no other possibilities).

In one embodiment, the system 100 is initially unable to determine that the next token and/or the historical token sequence is unique. This may occur, for instance, for various possible reasons. First, the system 100 may determine that the most recent token (e.g., $T_n$) does not "look" like any piece or segment of the historical token set. Second, the system 100 may have added all of the next tokens from the observed time series of tokens to the variable token set without being able to determine that the next token and/or the historical token sequence is unique or meets a target number of possible predictions. Third, the system 100 may determine that one or more historical token sequences appear among the historical token set with the same frequency (e.g., $T_{n-1}$, $T_n$, X versus $T_{n-1}$, $T_n$, Y).

In one embodiment, when no next most token remains in the observed time series of tokens to add to the variable token set and the next token in the historical token sequence is not unique or does not meet the target number of possible predictions (e.g., the first scenario), the system 100 can remove the last added token (e.g., $T_n$) from the variable token set and then select the predicted next token as described above based on the variable token set without the last token (e.g., $T_{n-2}$, $T_{n-1}$). By way of example, the first scenario may be caused by the system 100 registering a pattern anomaly, or a change, in the data. In one instance, the length of the forecast may affect the system 100's processing speed. In one embodiment, the system 100 may also flag the observed time series of tokens as a possible token sequence to update the historical token set (i.e., update the model).

In one embodiment, if there are no more next most recent tokens in the observed time series of token to add to the variable token set and the system 100 cannot determine whether the next token in the historical token sequence is unique or meets the target number of possible predictions, the system 100 can determine respective occurrence frequencies of the next tokens and respective historical token sequences. In one embodiment, the system 100 selects the predicted next token from the next tokens and respective historical token sequences based on the respective frequencies. By way of example, the system 100 can determine whether the variable token set ($T_{n-1}$, $T_n$) is followed more often by the next token "X" or by the next token "Y" and then present the next token that occurs more frequently as the prediction. In one embodiment, wherein the system 100 determines that the next tokens and respective historical token sequences appear with equal frequency, the system 100 determines the predicted next token by breaking the tie in some other way (e.g., choosing the token that is most common overall in the historical data set).

In one embodiment, rather than presenting a single prediction for the next token, the system 100 presents more than one next token as possible predicted next tokens of the observed time series (e.g., by setting the target number of possible predictions to more than one unique next token/token set as described above). For example, in some applications, it may be advantageous to have multiple next token predictions. In one embodiment, the system 100 generates multiple next token predictions by avoiding recursively adding a next most recent token or looking backwards to an earlier point. For example, if three possible predictions were desired, the system 100 could simply look back until possibilities for the next token prediction were narrowed down to a set of at most three and then present those three token predictions. In one embodiment, the system 100 can calculate respective probabilities of each of the possible next token predictions and present the respective probabilities along with the next token predictions (e.g., token "X"=85%; token "Y"=10%; and token "Z"=5%).

Figure 2:
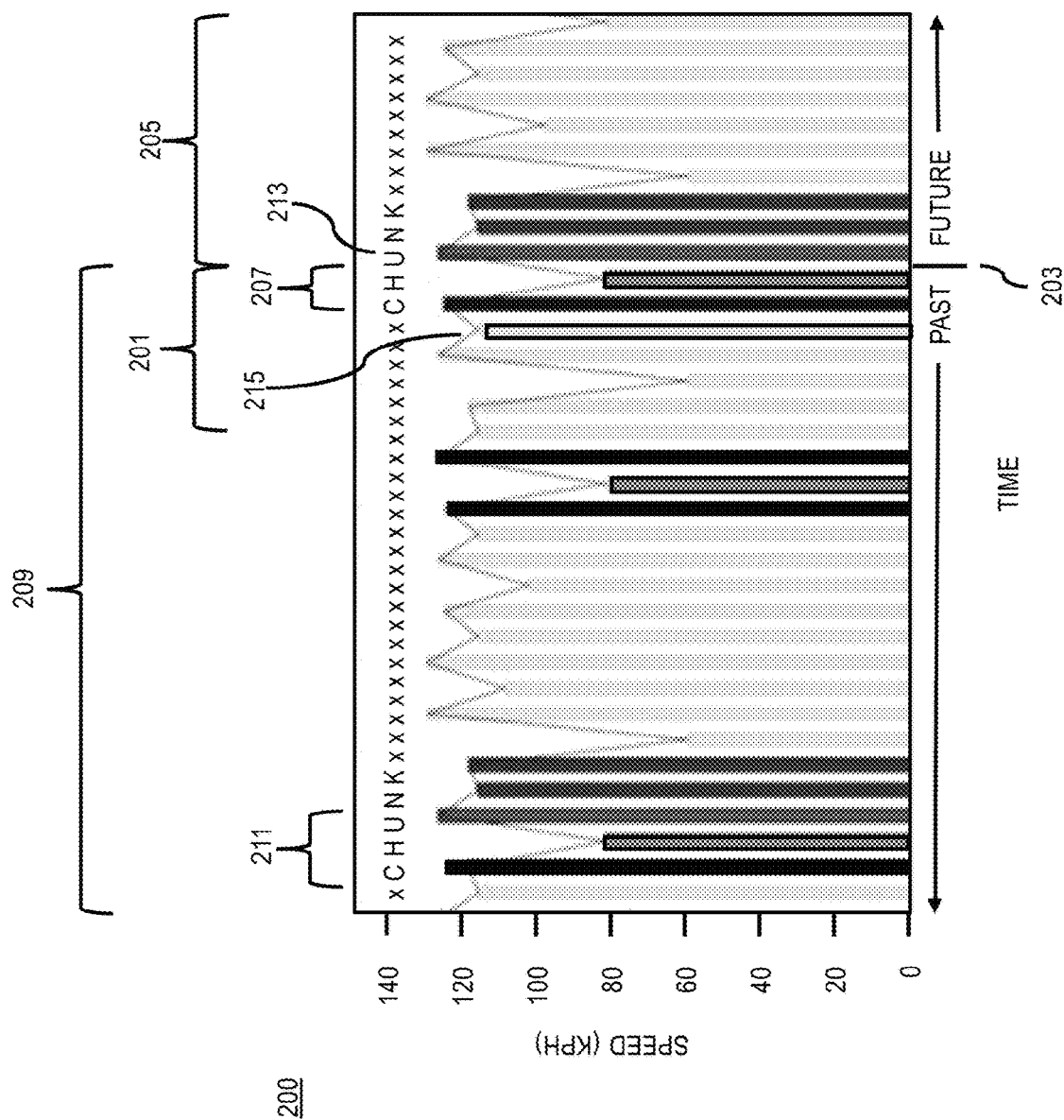
FIG. 2 is a diagram illustrating the next token prediction, according to one embodiment.

One example of the next token prediction process described above is schematically illustrated in FIG. 2. In one embodiment, the system 100 first receives an observed time series of tokens 201 (e.g., including tokens "C", and "H") as shown in the graph 200 of FIG. 2, wherein each of the tokens 201 represents an observed data pattern (e.g., patterns of traffic speed, weather, etc.). In particular, the point 203 designates the current time which delineates the observed time series of tokens 201 from predicted future token sequences 205.

In one embodiment, the system 100 adds the most recent token (e.g., token "H") from the observed time series of tokens 201 into a variable token set 207. In one embodiment, the system 100 enforces a minimum density of tokens in the historical token data such that the tokens "C" and "H" are included in a resulting historical token sequence of a token dictionary and not just token "H". As described above, the system 100 enforces the minimum density due to the fact that in some applications it may not be known a priori what the best choice of n tokens is for the variable token set 207 or a single choice of n (e.g., token "H") may not be optimal in all instances.

In one embodiment, the system 100 processes the historical token set 209 (e.g., stored in the geographic database 109), which includes at least the observed time series of tokens 201 to determine a historical token sequence comprising the variable token set 207 followed by a next token. In this instance, the system 100 can determine the historical sequence 211 comprised of the variable token set 207 and the next token "U". In one embodiment, the system 100 recursively adds a next most recent token from the observed time series of tokens 201 into the variable token set 207 for processing until the next token following the variable token set 207 (e.g., token "U") in the determined historical token sequence is determined to be unique or meet a target number of possible predictions. In this instance, the system 100 determines that the historical token sequence 211 is unique (i.e., in each instance that the variable token set 207 appears it is followed by the token "U"). In one embodiment, based on this determination, the system 100 presents the token "U" as the predicted next token of the observed time series of tokens 209, which is confirmed by the token 213 within the future token sequence 205. If this were not the case, the system 100 would add the token 215 to the variable token set 207 and start processing the historical token set again.

Returning to FIG. 1, in one embodiment, the system 100 comprises one or more vehicles 101a-101n (also collectively referred to as vehicles 101) and/or one or more user equipment devices (UEs) 103 that act as probes traveling over a road network. Although the vehicles 101 are depicted as automobiles, it is contemplated that the vehicles 101 can be any type of transportation vehicle manned or unmanned (e.g., planes, aerial drone vehicles, motor cycles, boats, bicycles, etc.), and the UEs 103 can be associated with any of the types of vehicles or a person or thing traveling within the bounded geographic area (e.g., a pedestrian). In one instance, the vehicles 101 are a fleet of commercial vehicles. In one embodiment, each vehicle 101 and/or UE 103 is assigned a unique probe identifier (probe ID) for use in reporting or transmitting probe data collected by the vehicles 101 and UEs 103. The vehicles 101 and UEs 103, for instance, are part of a probe-based system for collecting probe data for measuring traffic conditions in a road network. In one embodiment, each vehicle 101 and/or UE 103 is configured to report probe data as probe points, which are individual data records collected at a point in time that records telemetry data for that point in time. In one embodiment, the probe ID is valid for a certain period of time (e.g., at least five minutes for UE 103 sourced data and in perpetuity for commercial vehicle 101 sourced data) and the probe ID is cycled, particularly for consumer-sourced data, to protect the privacy of the source (e.g., a UE 103).

In one embodiment, a probe point can include attributes such as: (1) probe ID, (2) longitude, (3) latitude, (4) heading, (5) speed, and (6) time. The list of attributes is provided by way of illustration and not limitation. Accordingly, it is contemplated that any combination of these attributes or other attributes may be recorded as a probe point. For example, attributes such as altitude (e.g., for flight capable vehicles or for tracking non-flight vehicles in the altitude domain), tilt, steering angle, wiper activation, etc. can be included and reported for a probe point. In one embodiment, the vehicles 101 may include sensors for reporting measuring and/or reporting attributes. The attributes can also be any attribute normally collected by an on-board diagnostic (OBD) system of the vehicle, and available through an interface to the OBD system (e.g., OBD II interface or other similar interface). In one embodiment, this data allows the system 100 to calculate the speed of a vehicle 101 over a stretch of road, and then aggregate up to an estimation of the general population of vehicle 101 speeds.

The probe points can be reported from the vehicles 101 and/or UEs 103 in real-time, in batches, continuously, or at any other frequency requested by the system 100 over, for instance, the communication network 105 for processing by a token platform 107. The probe points also can be mapped to specific road links stored in the geographic database 109. In one embodiment, the system 100 (e.g., via the token platform 107) can generate probe traces from the probe points for an individual probe so that the probe traces represent a travel trajectory of the probe through the road network. In one embodiment, the travel trajectory can then be used to determine patterns of traffic speeds associated with fixed periods of time on a given link as discussed with respect to the various embodiments described herein.

In one embodiment, the patterns of traffic speed data can be provided by one or more speed sensors operating in the road network. For example, the road network may be equipped with sensors including, but not limited to, fixed inductive loop sensors, cameras, radar, and/or other remoting sensing devices capable of determining travel speeds of vehicles, devices, etc. traveling in the road network. In one embodiment, the sensors can be part of a road monitoring infrastructure that reports travel-speed and other telemetry data (e.g., location, heading, vehicle type, vehicle ID, etc.) to the token platform 107 or other monitoring centers, in real-time, continuously, in batches, on demand, according to a schedule, etc.

In one embodiment, the token platform 107 performs the processes for providing next token prediction as discussed with respect to the various embodiments described herein. In one embodiment, the token platform 107 can be a standalone server or a component of another device with connectivity to the communication network 105. For example, the component can be part of an edge computing network where remote computing devices (not shown) are installed along or within proximity of a road network to provide next token prediction from travel-speed data collected locally or within a local area served by the remote or edge computing device.

In one embodiment, the token platform 107 has connectivity or access to a geographic database 109 that includes mapping data about a road network (additional description of the geographic database 109 is provided below with respect to FIG. 3). In one embodiment, the dictionary of observed n-tuples of tokens, the traffic pattern data (e.g., live and/or historical probe or road speed sensor data data), the tokenized traffic pattern data, historical token sequences, or a combination thereof can also be stored in the geographic database 109 by the token platform 107. In addition or alternatively, the traffic pattern data can be stored by another component of the system 100 in the geographic database 109 for subsequent retrieval and processing by the token platform 107.

In one embodiment, the vehicles 101 and/or UEs 103 may execute an application 111 to present or use the tokenized traffic pattern data generated by the token platform 107. For example, if the application 111 is a navigation application, then the next token prediction can be used to determine routing information, provide updated estimated times of arrival (ETAs), provide notifications of predicted traffic phenomena or events, provide notifications of potentially problematic areas/intersections/interchanges, and the like.

By way of example, the UE 103 is any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 103 can support any type of interface to the user (such as "wearable" circuitry, etc.). In one embodiment, the UE 103 may be associated with a vehicle 101 (e.g., a car), a component part of the vehicle 101, a mobile device (e.g., a phone), and/or a combination of thereof. Similarly, the vehicle 101 may include computing components that can be perform all or a portion of the functions of the UE 103.

By way of example, the application 111 may be any type of application that is executable at the vehicle 101 and/or the UE 103, such as mapping application, location-based service applications, navigation applications, content provisioning services, camera/imaging application, media player applications, social networking applications, calendar applications, and the like. In one embodiment, the application 111 may act as a client for the token platform 107 and perform one or more functions of the token platform 107 alone or in combination with the token platform 107.

In one embodiment, the vehicles 101 and/or the UEs 103 are configured with various sensors for generating probe data. By way of example, the sensors may include a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture obstruction for analysis and documentation purposes), an audio recorder for gathering audio data, velocity sensors mounted on steering wheels of the vehicles, switch sensors for determining whether one or more vehicle switches are engaged, and the like.

In another embodiment, the sensors of the vehicles 101 and/or UEs 103 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the vehicle may detect the relative distance of the vehicle from lane or roadways, the presence of other vehicles, pedestrians, traffic lights, potholes and any other objects, or a combination thereof. In one scenario, the sensors may detect weather data, traffic information, or a combination thereof. In one example embodiment, the vehicles 101 and/or UEs 103 may include GPS receivers to obtain geographic coordinates from satellites 113 for determining current location and time associated with the vehicle 101 and/or UE 103 for generating probe data. Further, the location can be determined by a triangulation system such as A-GPS, Cell of Origin, or other location extrapolation technologies.

The communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In one embodiment, the token platform 107 may be a platform with multiple interconnected components. The token platform 107 may include multiple servers, intelligent networking devices, computing devices, components and corresponding software for providing trajectory bundles for map data analysis. In addition, it is noted that the token platform 107 may be a separate entity of the system 100, a part of the one or more services 115a-115m (collectively referred to as services 115) of the services platform 117, or included within the UE 103 (e.g., as part of the applications 111).

The services platform 117 may include any type of service 115. By way of example, the services 115 may include mapping services, navigation services, travel planning services, notification services, social networking services, content (e.g., audio, video, images, etc.) provisioning services, application services, storage services, contextual information determination services, location-based services, information-based services (e.g., weather, news, etc.), etc. In one embodiment, the services platform 117 may interact with the token platform 107, the UE 103, and/or the content provider 119 to provide the services 115.

In one embodiment, the content providers 119a-119k (collectively referred to as content providers 119) may provide content or data to the vehicles 101 and/or UEs 103, the token platform 107, and/or the services 115. The content provided may be any type of content, such as textual content, audio content, video content, image content, etc. In one embodiment, the content providers 119 may provide content that may aid in making next token prediction using a dynamic number of previously observed tokens. In one embodiment, the content providers 119 may also store content associated with the vehicles 101, the UE 103, the token platform 107, and/or the services 115. In another embodiment, the content providers 119 may manage access to a central repository of data, and offer a consistent, standard interface to data, such as a repository of probe data, speed limit for one or more road links, speed information for at least one vehicle, traffic jam threshold for at least one road link, other traffic information, etc. Any known or still developing methods, techniques or processes for retrieving and/or accessing features for road links from one or more sources may be employed by the token platform 107.

By way of example, the vehicles 101, the UEs 103, the token platform 107, the services platform 117, and the content providers 119 communicate with each other and other components of the system 100 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 3:
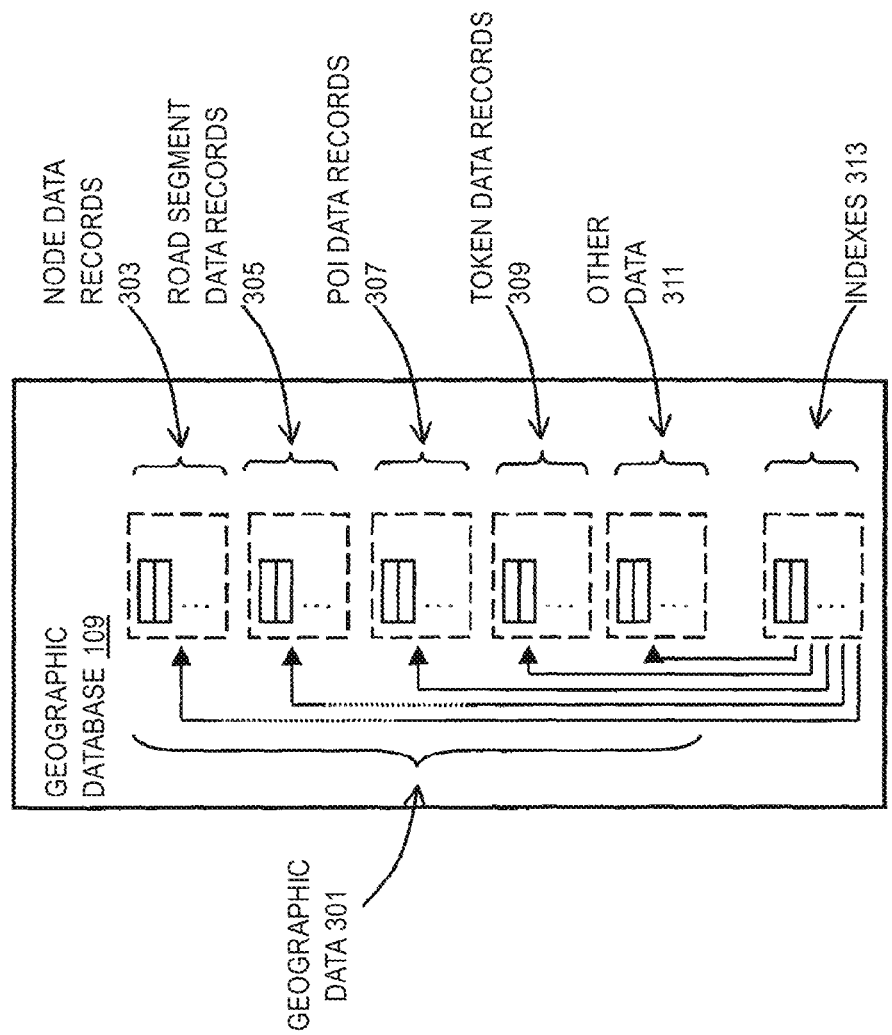
FIG. 3 is a diagram of a geographic database, according to one embodiment.

FIG. 3 is a diagram of the geographic database 109 of system 100, according to exemplary embodiments. In the exemplary embodiments, observed time series of tokens, variable token sets, historical token sets, previously predicted next tokens, travel-speed patterns (or another other pattern or condition being represented by the tokens), travel-speed templates, and/or any other data used by the system 100 as described in the various embodiments can be stored, associated with, and/or linked to the geographic database 109 or data thereof. In one embodiment, the geographic database 109 includes geographic data 301 used for (or configured to be compiled to be used for) mapping and/or navigation-related services, such as for personalized route determination, according to exemplary embodiments. For example, the geographic database 109 includes node data records 303, road segment or link data records 305, POI data records 307, token data records 309, other data records 311, and/or indexes 313, for example. More, fewer or different data records can be provided.

In one embodiment, the node data records 303 and the road link data records 305 represent a road network, such as used by vehicles, cars, and/or other entities. In other words, the nodes and links of the data records 303 and 305 comprise a system for representing the geospatial characteristics of a transportation in which the nodes represent various location points (e.g., latitude and longitude) of the network and the links represent an extent of a road or path between the nodes. Generally, the nodes are located at intersections points of the road network to minimize the number of nodes needed to represent a transportation network. However, in some embodiments, a node can also fall at a non-intersection point. In this case, the node at the non-intersection can be a shape node which can be used to indicate or more closely follow a road or path with a more complex shape. Alternatively, the geographic database 301 can contain path segment and node data records or other data that represent pedestrian paths or areas in addition to or instead of the vehicle road record data, for example.

The road link and nodes can be associated with attributes, such as a functional class, a road density or link length, a speed attribute (e.g., speed limit along a link, a free-flow speed of traffic along a link, and/or any other indication of an expected speed of travel along the link), parking availability information, geographic coordinates, street names, address ranges, turn restrictions at intersections, and other navigation related attributes, as well as POIs, such as traffic controls (e.g., stoplights, stop signs, crossings, etc.), gasoline stations, hotels, restaurants, museums, stadiums, offices, automobile dealerships, auto repair shops, buildings, stores, parks, etc. As indicated above, the geographic database 109 can include data about the POIs and their respective locations in the POI data records 307. The geographic database 109 can also include data about places, such as cities, towns, or other communities, and other geographic features, such as bodies of water, mountain ranges, etc. Such place or feature data can be part of the POI data or can be associated with POIs or POI data records 307 (such as a data point used for displaying or representing a position of a city).

In one embodiment, the geographic database 109 also includes token data records 309 for storing information about the tokenized representation of patterns of traffic speed collected with respect to the links or road segments stored in the geographic database 109. For example, the token data records 309 may store one or more dictionaries of tokens representing travel-speed patterns or templates determined from travel-speed data collected from probes traversing the road network or from road speed sensors operating in the road network represented in the geographic database 109. In one embodiment, it contemplated that a token dictionary (e.g., of observed n-tuples of tokens for all n up to some point) can be generated for and/or applicable to all links stored in the geographic database 109, a subset of the links, or individual links. In other words, the dictionary can be generated at different levels of granularity within a road network. In one embodiment, the granularity can be based on the attributes of links (e.g., a functional class, etc.). For example, a dictionary can be generated to represent travel-speed patterns or templates observed in a particular functional class (e.g., arterial roadways). The resulting dictionary can then be used for representing and predicting traffic conditions for that particular functional class. Similarly, dictionaries can be specific to an individual link so that different links can have different applicable dictionaries. In yet another embodiment, the token data records 309 also store historical sequences of observed tokens and/or related travel-speed data streams matched to specific links, areas, regions, etc. of the road network represented in the geographic database 109. The system 100 can then query for this historical data to provide a next token prediction.

In one embodiment, the other data records 311 include cartographic ("carto") data records, routing data, and maneuver data, which can facilitate generating routing and/or navigation information for end user devices. In one embodiment, the indexes 313 may improve the speed of data retrieval operations in the geographic database 301. For example, the indexes 313 may be used to quickly locate data without having to search every row in the geographic database 301 every time it is accessed.

The geographic database 109 can be maintained by the content provider 119 in association with the services platform 117 (e.g., a map developer). The map developer can collect geographic data to generate and enhance the geographic database 109. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 109 can be a master geographic database stored in a format that facilitates updating, maintenance, and development. For example, the master geographic database 109 or data in the master geographic database 109 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a UE 103, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 109 can be a master geographic database, but in alternate embodiments, the geographic database 109 can represent a compiled navigation database that can be used in or with end user devices (e.g., vehicle 101, UE 103, etc.) to provide navigation-related functions. For example, the geographic database 109 can be used with the end user device to provide an end user with navigation features. In such a case, the geographic database 109 can be downloaded or stored on the end user device (e.g., vehicle 101, UE 103, etc.), such as in application 111, or the end user device can access the geographic database 109 through a wireless or wired connection (such as via a server and/or the communication network 105), for example.

In one embodiment, the end user device can be an in-vehicle navigation system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the navigation device (e.g., UE 103) can be a cellular telephone. An end user can use the device navigation functions such as guidance and map display, for example, and for determination of route information to at least one identified point of interest, according to exemplary embodiments.

Figure 4:
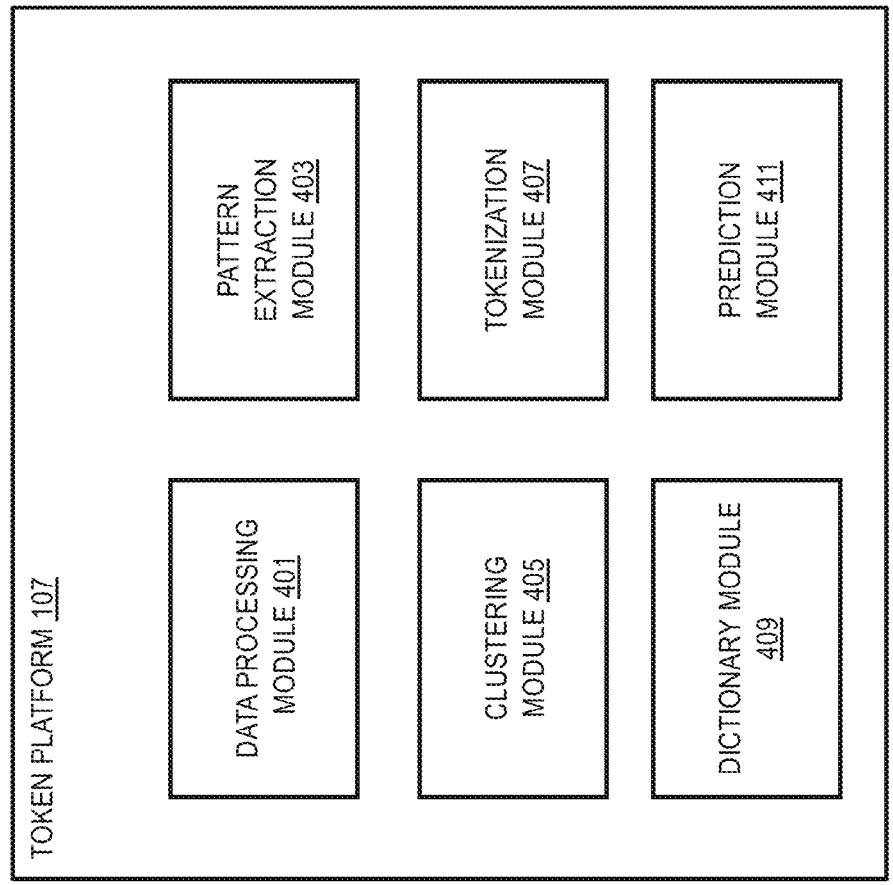
FIG. 4 is a diagram of the components of a token platform, according to one embodiment.

FIG. 4 is a diagram of the components of the token platform 107, according to one embodiment. By way of example, the token platform 107 includes one or more components for providing a next token prediction using a dynamic number of previously observed tokens. It is contemplated that the functions of these components may be combined or performed by other components of equivalent functionality. In this embodiment, the token platform 107 includes a data processing module 401, a pattern extraction module 403, a clustering module 405, a tokenization module 407, a dictionary module 409, and a prediction module 411. The above presented modules and components of the token platform 107 can be implemented in hardware, firmware, software, or a combination thereof. Though depicted as a separate entity in FIG. 1, it is contemplated that the token platform 107 may be implemented as a module of any of the components of the system 100. In another embodiment, the token platform 107 and/or one or more of the modules 401-411 may be implemented as a cloud-based service, local service, native application, or combination thereof. The functions of the token platform 107 and the modules 401-411 are discussed with respect to FIGS. 5-7 below.

Figure 5:
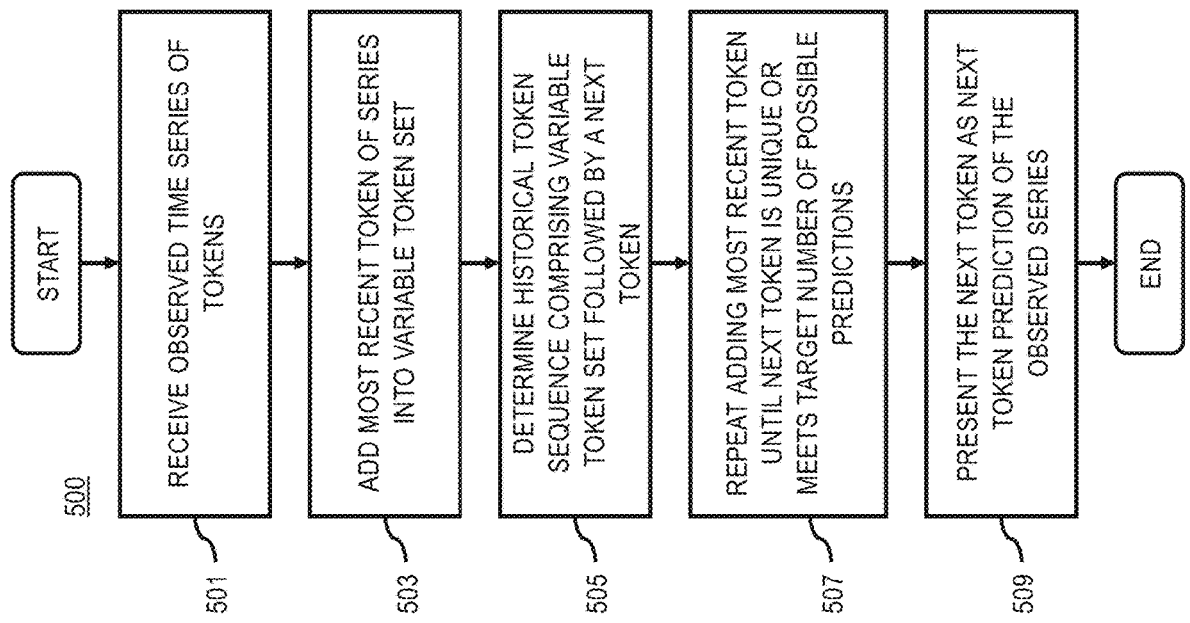
FIG. 5 is a flowchart of a process for providing a next token prediction using a dynamic number of previously observed tokens, according to one embodiment.
Figure 10:
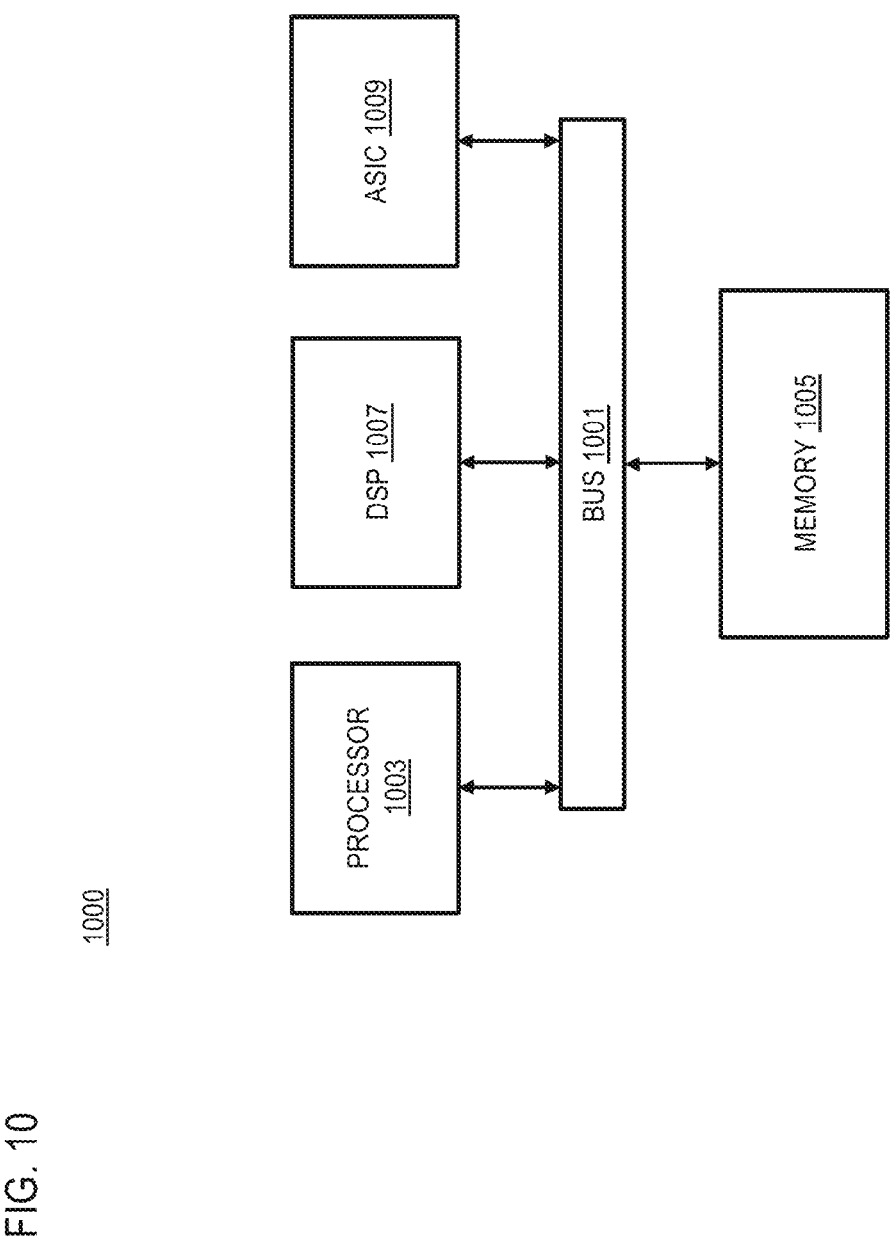
FIG. 10 is a diagram of a chip set that can be used to implement an embodiment of the invention.

FIG. 5 is a flowchart of a process for providing a next token prediction using a dynamic number of previously observed tokens, according to one embodiment. In various embodiments, the token platform 107 and/or the modules 401-411 of the token platform 107 as shown in FIG. 4 may perform one or more portions of the process 500 and may be implemented in, for instance, a chip set including a processor and a memory as shown in FIG. 10. As such, the token platform 107 and/or the modules 401-411 can provide means for accomplishing various parts of the process 500, as well as means for accomplishing embodiments of other processes described herein in conjunction with other components of the system 100. Although the process 500 is illustrated and described as a sequence of steps, it is contemplated that various embodiments of the process 500 may be performed in any order or combination and need not include all of the illustrated steps.

In step 501, the data processing module 401 receives an observed time series of tokens from the tokenization module 407. In one embodiment, the series of tokens represents a sequence of tokens at a certain time. For example, the tokens may represent sequences of traffic conditions (or patterns) associated with a fixed period of time on a given link. In particular, the tokens may represent the movement of vehicles (GPS probe data) throughout a study area (e.g., a series of roadways) (the "traffic"). In one instance, the series of tokens may also represent any situation wherein tokens of a time series have the property that the next token may be determined by the token or tokens that have proceeded it.

In step 503, the clustering module 405 adds a most recent token from the observed time series of tokens into a variable token set. By way of example, each variable token set can include any n-tuple number of tokens (e.g., with n>1). In one embodiment, the clustering module 405 clusters a variable length of history, namely variable n observed tokens. In one embodiment, the clustering module 405 enforces a minimum density for the variable token set. For example, if the most recent token observed is $T_n$, the clustering module 405 will add $T_n$ and $T_{n-1}$ to form the variable token set ($T_{n-1}$, $T_n$). In one embodiment, the clustering module 405 builds up a dictionary of observed n-tuples of tokens for all n up to some point (e.g., the observed time series of tokens).

In step 505, the data processing module 401 in connection with the pattern extraction module 403 processes a historical token set to determine a historical token sequence comprising the variable token set followed by a next token. In one embodiment, the historical token set comprises at least the observed time series of tokens, tokenized data collected over a time period, or a combination thereof. In one embodiment, data processing module 401 processes the historical data set by comparing or attempting to match the variable token set (e.g., $T_{n-1}$, $T_n$) and the next token (e.g., token "X") among the historical token set. In one embodiment, the historical token sequence comprises the variable token set followed by the next token (e.g., $T_{n-1}$, $T_n$, X).

In step 507, the clustering module 405 in connection with the pattern extraction module 403 recursively adds a next most recent token from the observed time series of tokens into the variable token set for processing until the next token following the variable token set in the determined historical token set is determined to be unique or meets a target number of possible predictions. In one embodiment, the pattern extraction module 403 determines that the next token is unique if it determines that there is only one historical token sequence that includes the variable token set followed by the next token. In one embodiment, the "only one" historical token sequence may comprise just one instance or it may comprise a number of instances. In one embodiment, if the pattern extraction module 403 determines that the historical token sequence is not unique or does not meet a target number of possible predictions, the clustering module 405 recursively adds a next most recent token form the observed token time series of tokens into the variable token set until the pattern extraction module 403 determines that the next token is unique or meets a target number of possible predictions. By way of example, if the first variable token set is $T_{n-1}$ and $T_n$, then the clustering module 405 can add the most recent token from the observed time series of tokens (e.g., $T_{n-2}$) into the variable token set (e.g., $T_{n-2}$, $T_{n-1}$, $T_n$) and then the pattern extraction module 403 can process the historical set as described. In one embodiment, this adding process continues until the pattern extraction module 403 determines that the historical token sequence is unique or meets a target number of possible predictions or the clustering module 405 runs out observed time series of tokens to add to the variable token set.

In step 509, once the pattern extraction module 403 determines that the next token is unique or meets a target number of possible predictions, the prediction module 411 presents the next token as a predicted next token of the observed time series of tokens. For example, the prediction module 411 may present token "X" as the next token (e.g., $T_{n+1}$) of the observed time series of tokens.

Figure 6:
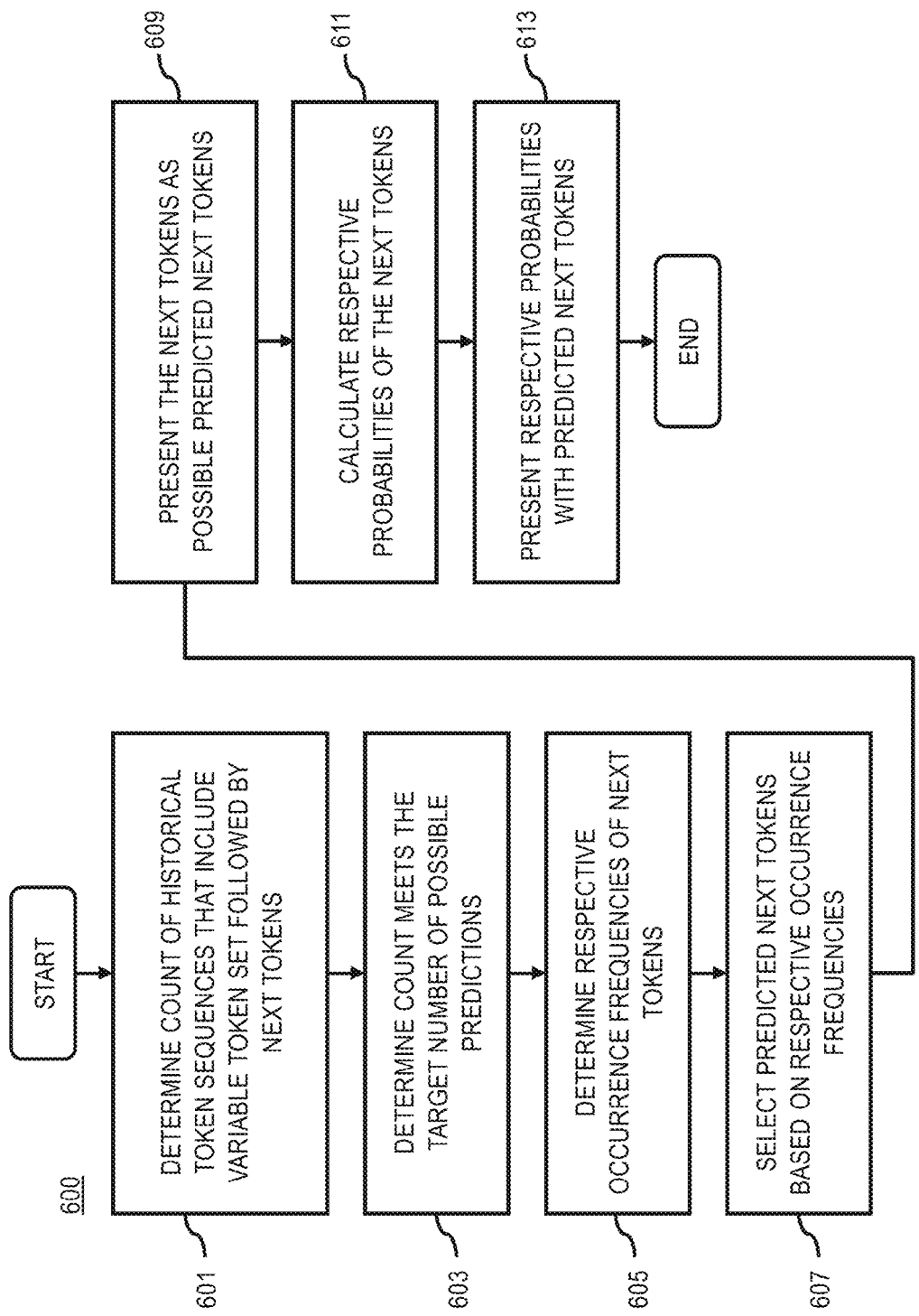
FIG. 6 is a flowchart of a process for providing a target number of next token predictions using a dynamic number of previously observed tokens, according to one embodiment.

FIG. 6 is a flowchart of a process for providing a target number of next token predictions using a dynamic number of previously observed tokens, according to one embodiment. In various embodiments, the token platform 107 and/or the modules 401-411 of the token platform 107 as shown in FIG. 4 may perform one or more portions of the process 600 and may be implemented in, for instance, a chip set including a processor and a memory as shown in FIG. 10. As such, the token platform 107 and/or the modules 401-411 can provide means for accomplishing various parts of the process 600, as well as means for accomplishing embodiments of other processes described herein in conjunction with other components of the system 100. Although the process 600 is illustrated and described as a sequence of steps, it is contemplated that various embodiments of the process 600 may be performed in any order or combination and need not include all of the illustrated steps.

In step 601, the pattern extraction module 403 determines whether the next token meets a target number of possible predictions by determining a count of the historical token sequence and at least one other historical token sequence that include the variable token set followed by the next token or another next token. In other words, the pattern extraction module 403 identifies and counts all possible historical token sequences in the historical token set that include the variable token set and any other next token. By way of example, the pattern extraction module 403 may determine that there is one historical token sequence that includes the variable token set followed by the next token "X", and another historical token sequence that includes the variable token set followed by the next token "Y". In this example, the count of the number of possible predictions would be equal to two.

In step 603, the data processing module 401 determines whether the count meets the target number of possible predictions. For example, when the target number of possible predictions is equal to one, the data processing module 401 is effectively searching for a single unique prediction. However, when the target number of possible predictions is greater than one, the data processing module 401 is searching for more than one unique prediction. In other words, the data processing module 401 can in the process of adding additional tokens into the variable token set when the number of possible predictions is reduced to target number. Continuing with the example, if the target number of possible predictions is two and the pattern extraction module 403 determines that the current size of the variable token set results in a count of two possible next token predictions (e.g., two tokens X and Y are observed following the variable token set in two respective historical token sequences), the data processing module 401 can end the process of adding additional tokens from the observed time series of tokens into the variable token set and output the resulting possible next token predictions for further processing by the system 100.

In step 605, the clustering module 405 determines respective occurrence frequencies of the next token and/or another next token in the historical token sequence and the at least one other historical token sequence. In one embodiment, wherein there are no longer any more next most recent tokens for the clustering module 405 to add to the variable token set and the pattern extraction module 403 cannot determine whether the next token in the historical token sequence is unique or meets the target number of possible predictions, the clustering module 405 can determine respective occurrence frequencies. For example, the clustering module 405 can determine whether the variable token set $(T_{n-1}, T_n)$ is followed more often by the next token "X" or by the next token "Y" in the historical token set.

In step 607, the prediction module 411 selects the predicted next token from among the next token and/or another next token based on the respective occurrence frequencies. For example, wherein the clustering module 405 determines that the variable token set $(T_{n-1}, T_n)$ is followed more often by the next token "X", the prediction module 411 can select the next token "X" as the predicted next token. However, in the third possible scenario described above, the two or more sequences appear with the same frequency. Therefore, in one embodiment, the prediction module 411 must break the tie in some other way, for example, by choosing the next token that is most common overall among the historical data set.

In step 609, the prediction module 411 presents the next token and/or another token as possible predicted next tokens of the observed time series of tokens. In one embodiment, rather than presenting a single prediction, it may be advantageous to present multiple next token predictions (e.g., based on an application requirement). In one embodiment, the prediction module 411 generates multiple next token predictions by preventing the clustering module 405 from recursively adding a next most recent token or looking backwards to an earlier point. By way of example, if three possible predictions were desired, the pattern extraction module 403 could simply look back until possibilities for the next token prediction were narrowed down to a set of at most three predictions and then present those three predictions.

In step 611, the clustering module 405 calculates respective probabilities of the next token and another next token as possible next tokens of the observed time series of tokens. By way of example, the clustering module 405 may assign an 85% probability to the next token "X", a 10% probability to the next token "Y", and a 5% probability to the next token "Z". Then, in step 613, the prediction module 411 can present the respective probabilities along with the presenting of the next tokens as the predicted next tokens.

Figure 7:
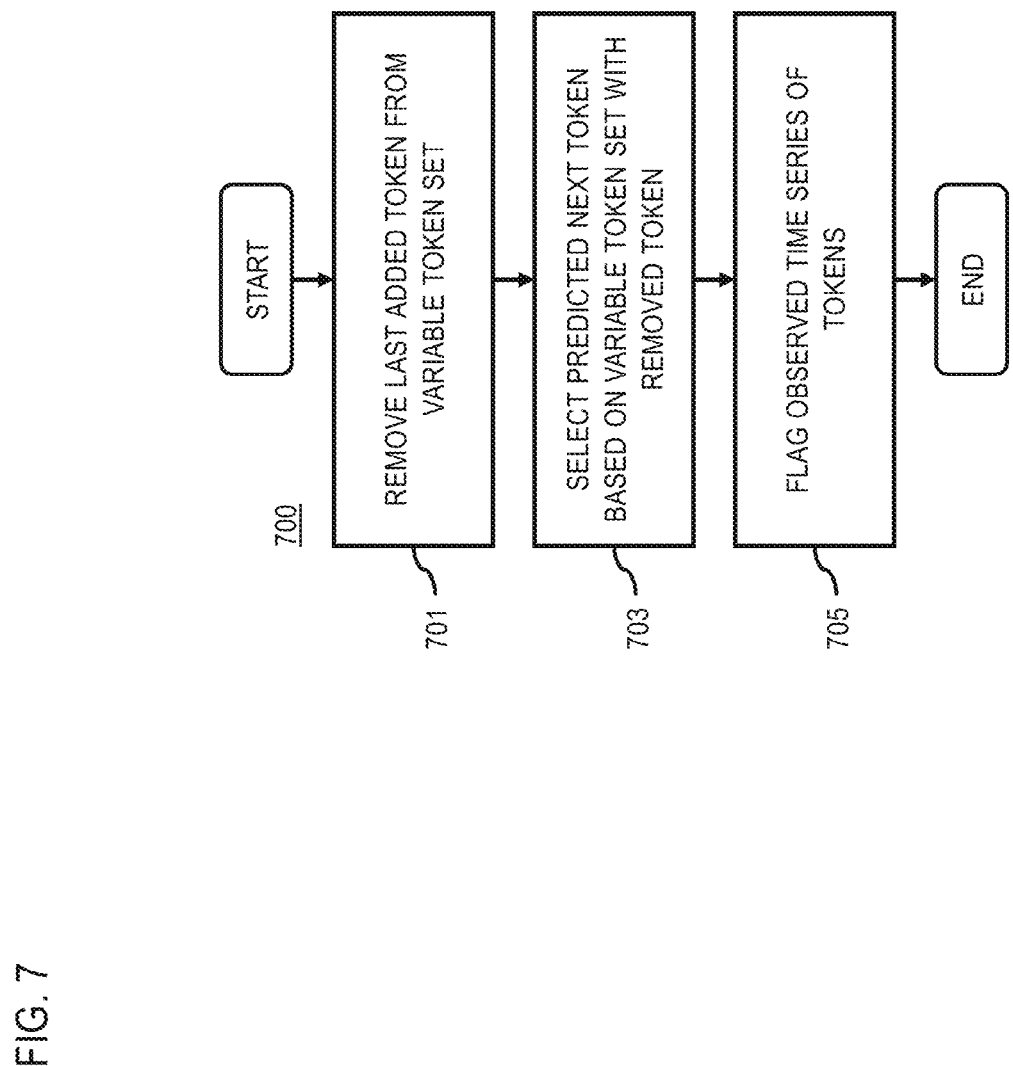
FIG. 7 is a flowchart of a process for providing one or more next token predictions using a dynamic number of previously observed tokens in instances where the next token or tokens are neither unique nor meet a target number of possible predictions, according to one embodiment.

FIG. 7 is a flowchart of a process for providing a next token prediction using a dynamic number of previously observed tokens in instances where the next token is neither unique nor meets meet a target number of possible predictions, according to one embodiment. In various embodiments, the token platform 107 and/or the modules 401-411 of the token platform 107 as shown in FIG. 4 may perform one or more portions of the process 700 and may be implemented in, for instance, a chip set including a processor and a memory as shown in FIG. 10. As such, the token platform 107 and/or the modules 401-411 can provide means for accomplishing various parts of the process 700, as well as means for accomplishing embodiments of other processes described herein in conjunction with other components of the system 100. Although the process 700 is illustrated and described as a sequence of steps, it is contemplated that various embodiments of the process 700 may be performed in any order or combination and need not include all of the illustrated steps.

In step 701, wherein no next most recent token remains in the observed time series of tokens to add to the variable token set and the next token in the historical token sequence is not unique or does not meet the target number of possible predictions, the clustering module 405 removes the last added token (e.g., $T_n$) from the variable token set (e.g., $T_{n-1}$, $T_n$). One possible reason that the clustering module 405 may add all of the most recent tokens from the observed time series of tokens and the pattern extraction module 403 may still not be able to determine that the next token is unique or meets the target number of possible prediction is because the last added token does not match with any of the tokens within the historical token set. For example, this may occur as a result of a pattern anomaly, or a change, in the data.

In step 703, the prediction module 411 selects the predicted next token based on the variable token set with the last added token removed. In one embodiment, the prediction module 411 would follow the steps described above with respect to steps 605 through 609 to select the predicted next token since removing the last added token would result in either of the second or the third possible scenarios described above wherein the pattern extraction module 403 is unable to determine a next token or and/or historical token sequence that is unique or meets a target number of possible predictions.

In step 705, the dictionary module 409 flags the observed time series of tokens as a possible token sequence to update the historical token set. By way of example, at run time, the dictionary module 409 could flag the timestamp where the change occurred and update the historical token set accordingly.

Figure 8A:
FIGS. 8A through 8Q are diagrams illustrating a use case example of predicting tokenized weather effects on highway traffic speeds, according to one embodiment.
Figure 8C:
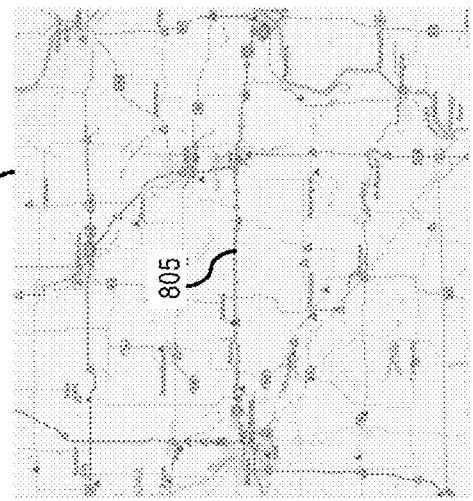
Figure 8E:
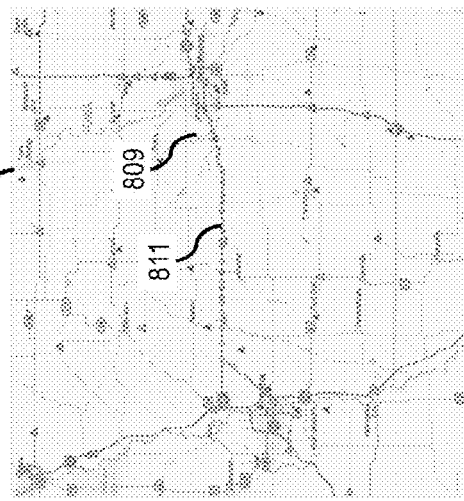
Figure 8B:
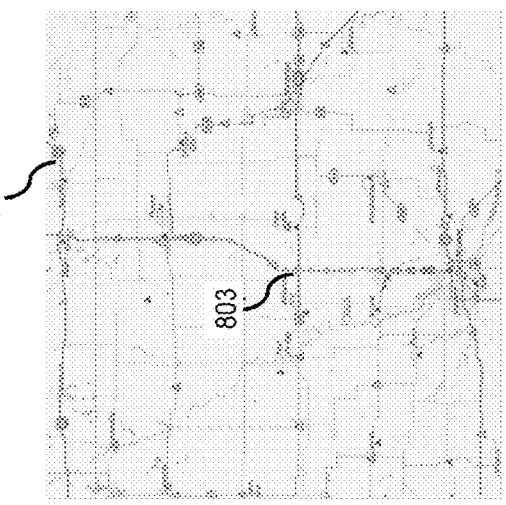
Figure 8D:
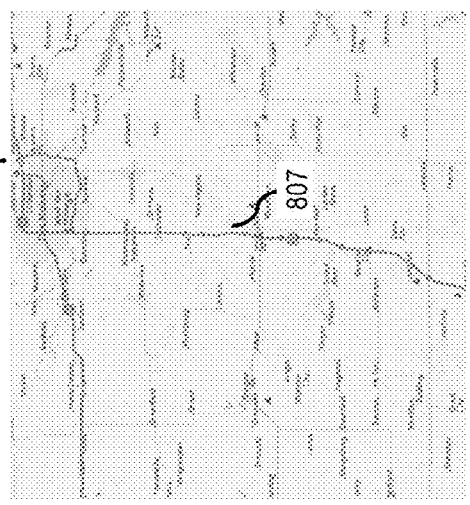
Figure 8F:
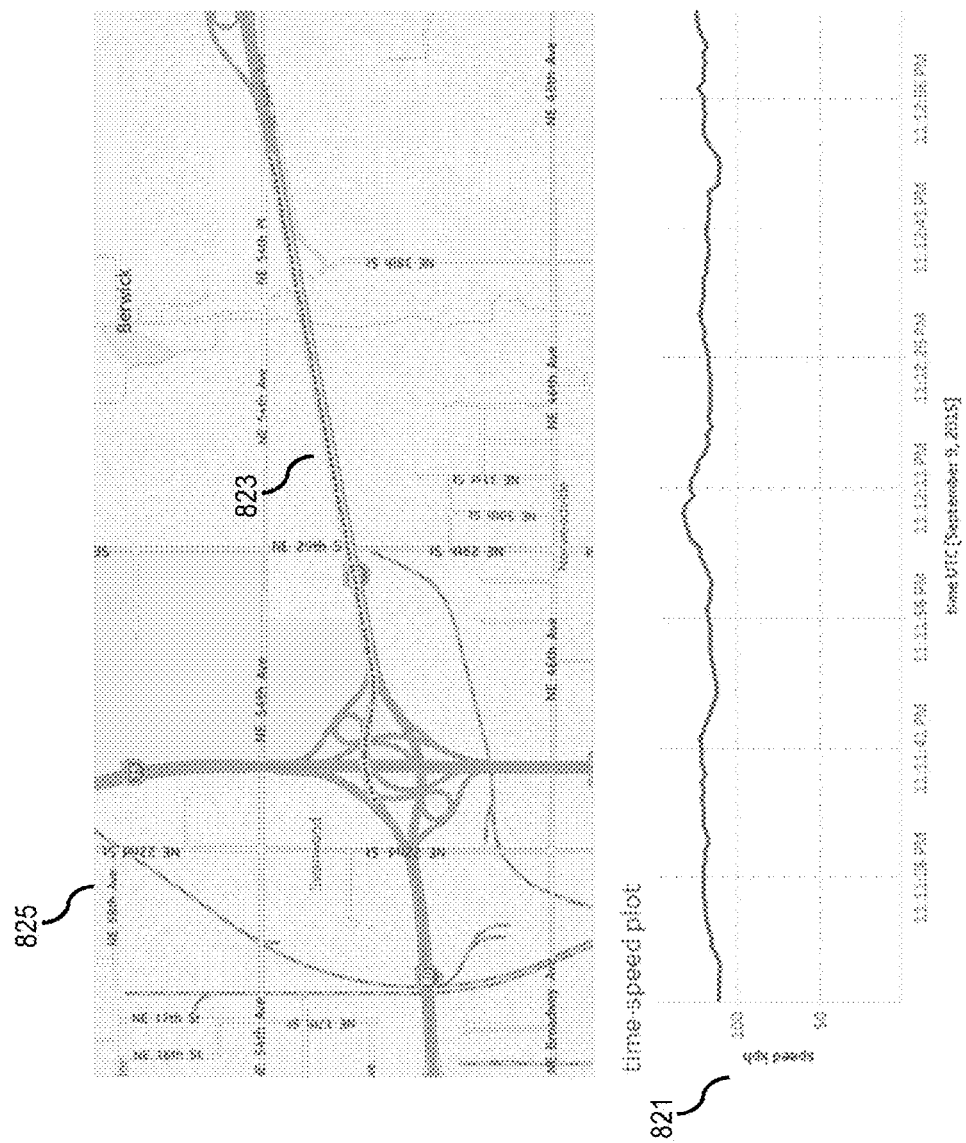
Figure 8G:
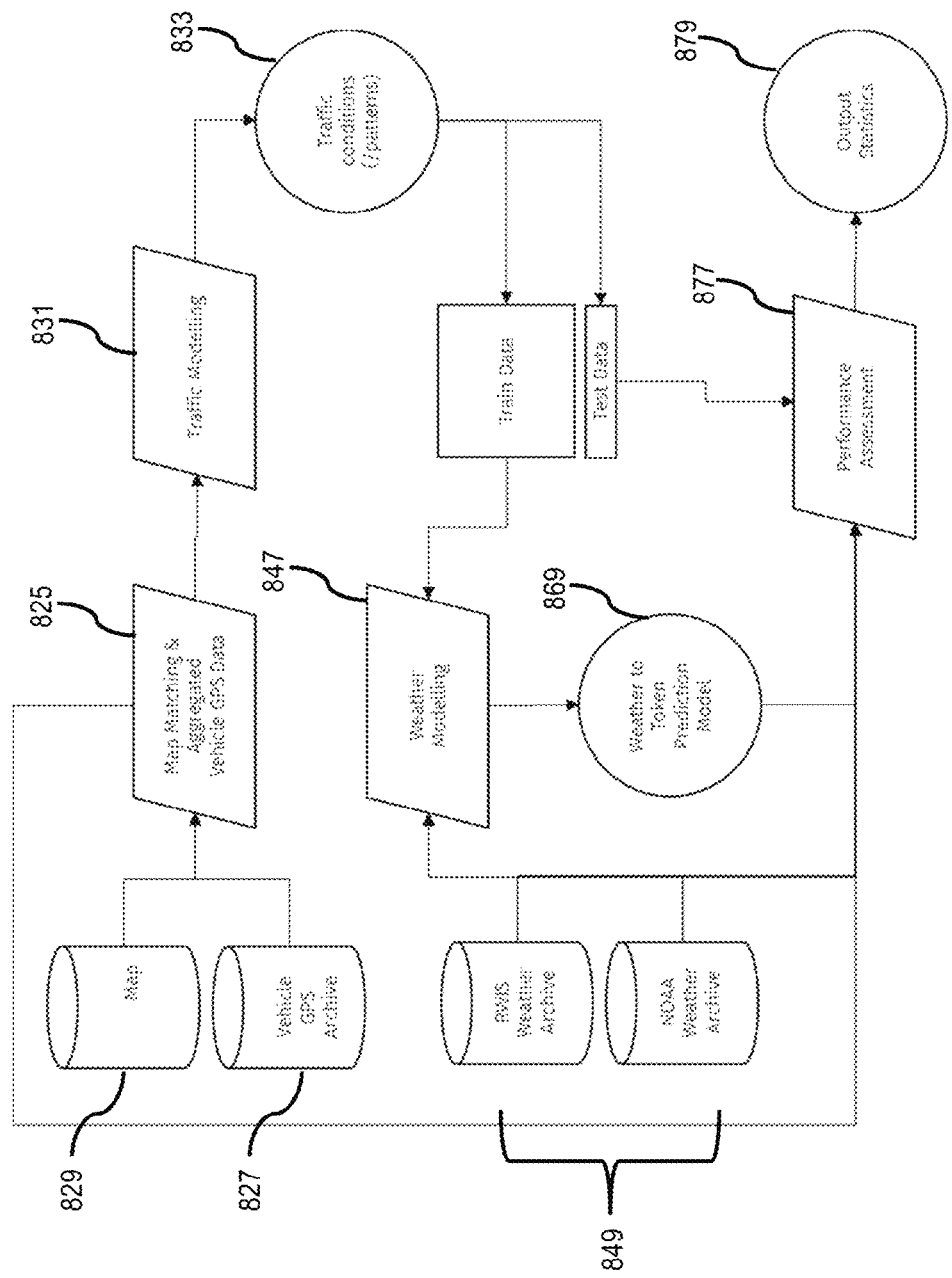
Figure 8H:
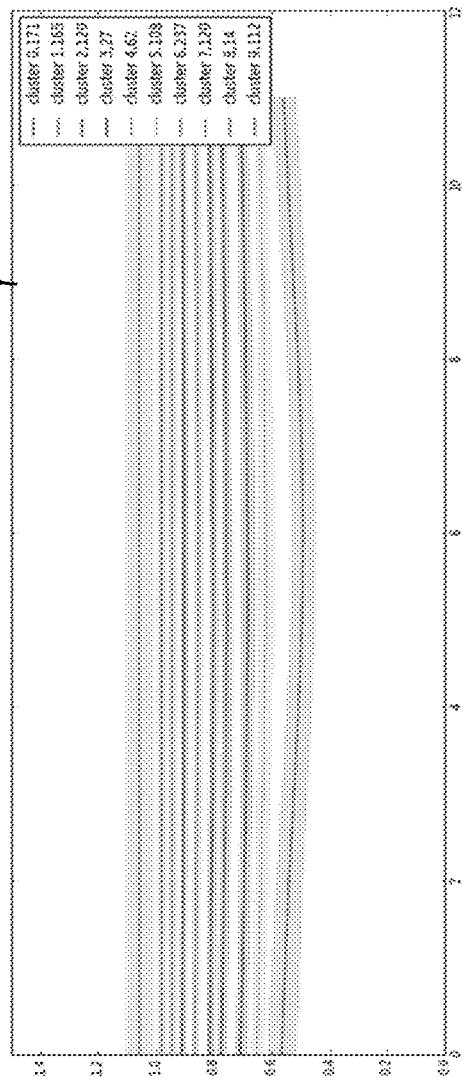
Figure 8I:
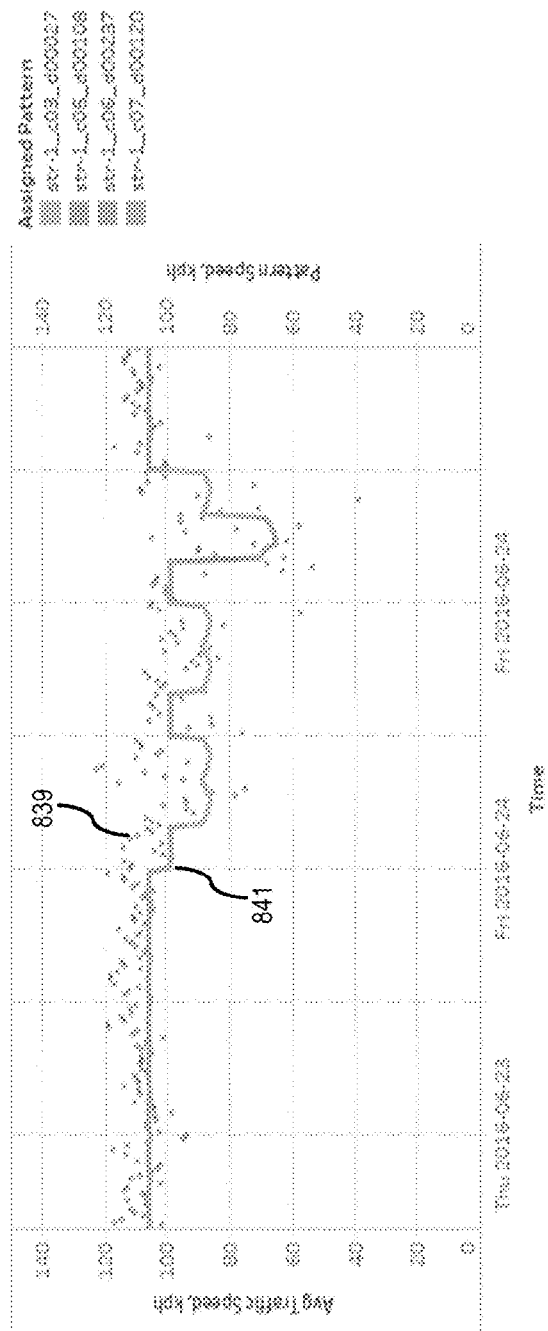
Figure 8J:
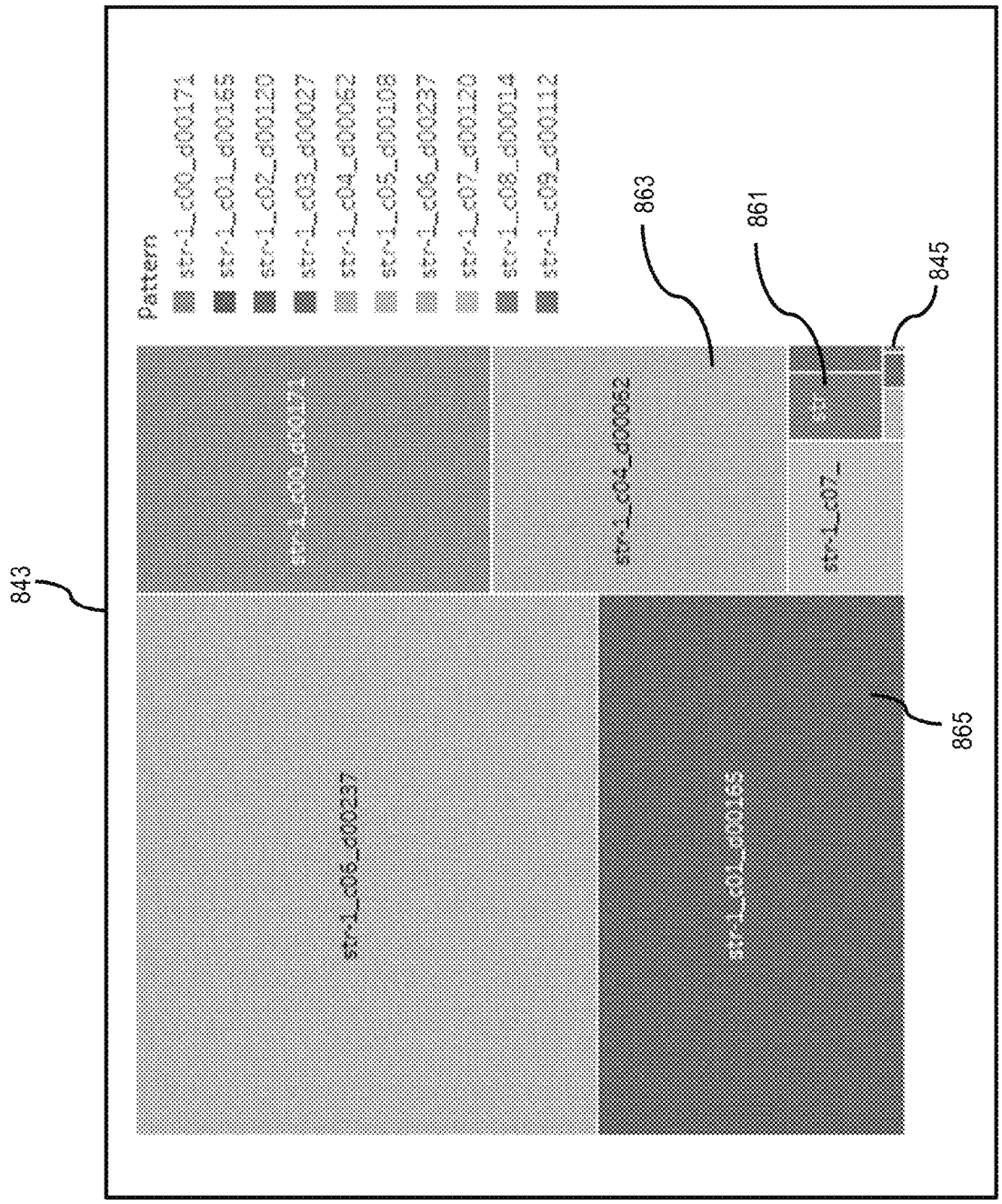
Figure 8N:
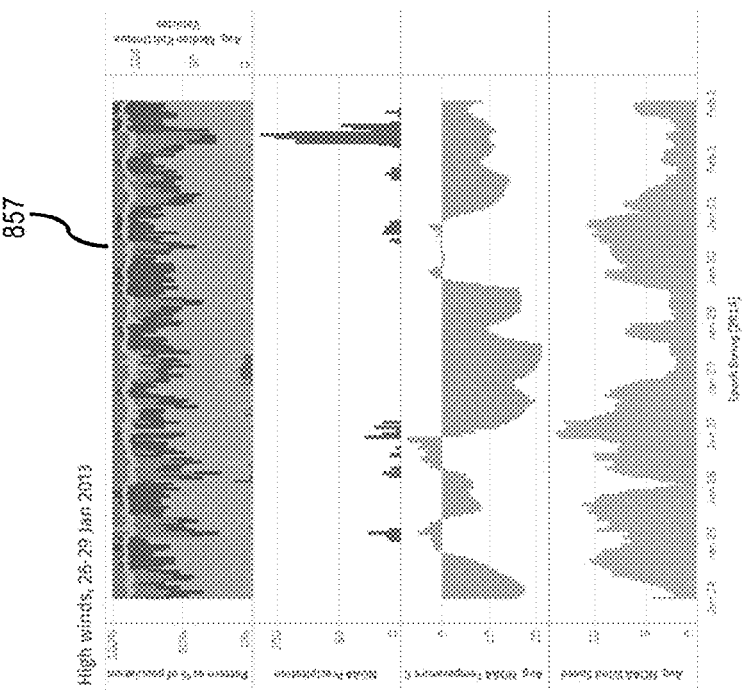
Figure 8M:
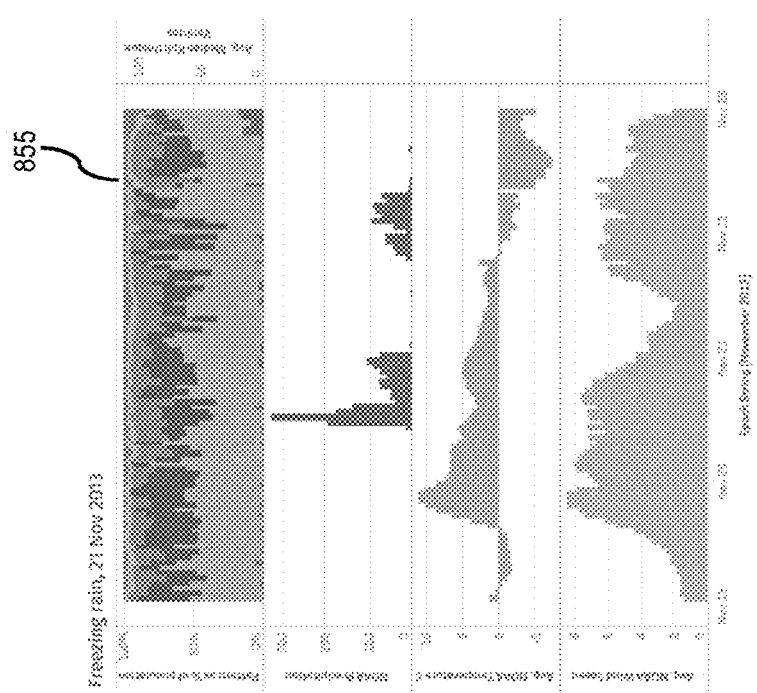
Figure 8O:
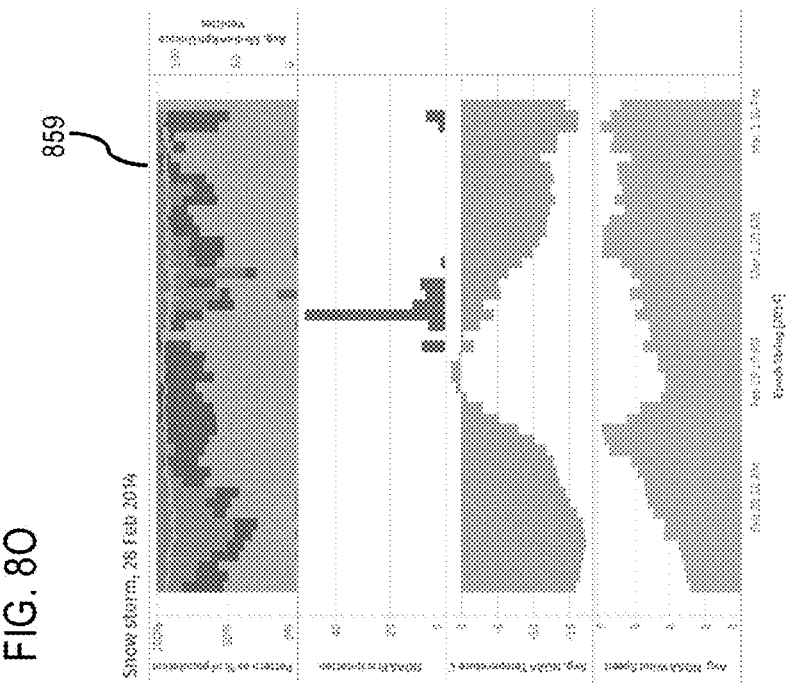
Figure 8Q:
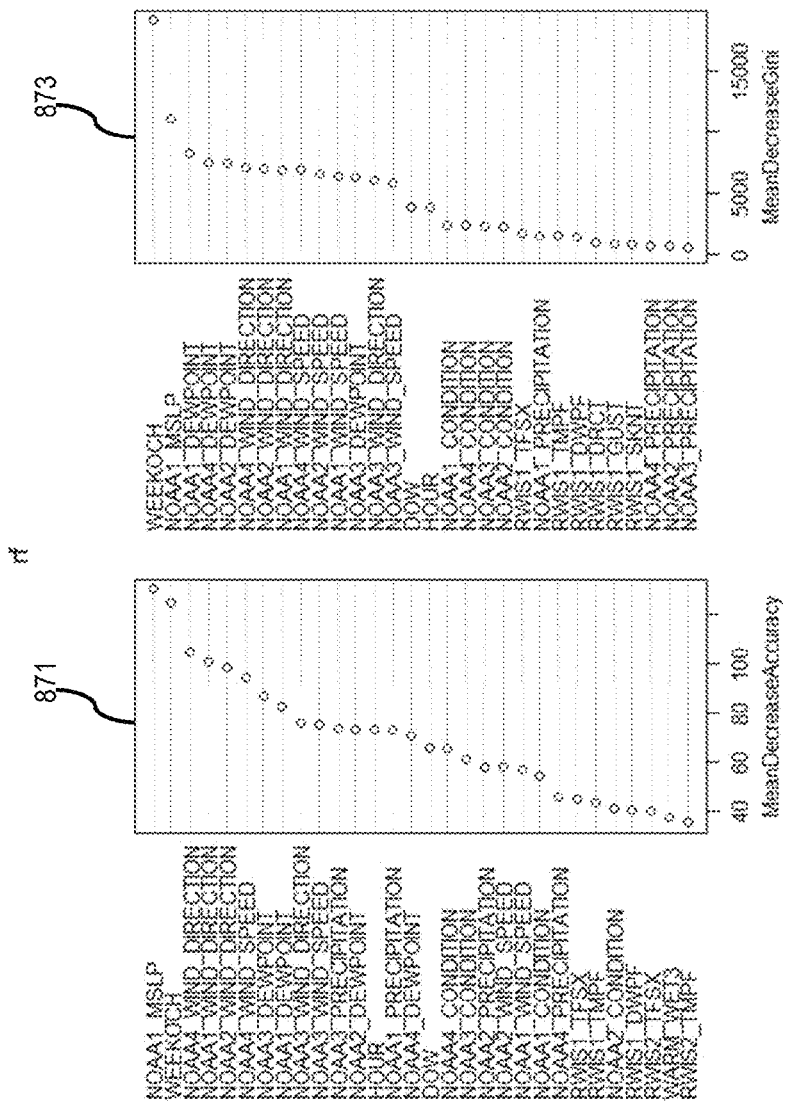

FIGS. 8A through 8Q are diagrams illustrating a use case example of next token prediction using a dynamic number of previously observed time series tokens related to weather effects on traffic speeds, according to one embodiment. As shown, map 801 of FIG. 8A depicts sections 803, 805, 807, 809, and 811 of a highway (e.g., embodying nearly 1000 miles of roadway). The maps 813, 815, 817, and 819 of FIGS. 8B through 8E, respectively, depict the sections 803 through 811 in greater detail. In the examples of FIGS. 8A-8E, the system 100 monitors and collects probe data from vehicles traveling in the mapped areas over a period of time to construct a historical token set. For example, 19.6 billion GPS probe points across nearly 2 billion unique vehicle/traffic message channel (TMC)/5-minute epochs can be collected a four year period. The token platform 107 can then process the collected probe data to determine distinct traffic patterns occurring across different road segments and time epochs. A traffic pattern can indicate patterns such as traffic speed and/or volume over a period of time. FIG. 8 illustrates an example of traffic speed pattern 821 observed for a road segment 823 represented in the map 825. More specifically, traffic speed pattern 821 depicts a plot of time versus speed as a vehicle travels on the road segment 823 at a given time epoch. The token platform 107 can identify and group all patterns into a common set of patterns that occur throughout a mapped geographic area (e.g., across the mapped areas of FIGS. 8A-8E). The token platform 107 can then create a dictionary of the patterns that assigns unique tokens to represent each pattern. In this way, the observed traffic in any area over time can be represented as a time-series of tokens. For example, in the example of FIG. 8F, the traffic speed pattern 821 can be represented by a token A to indicate the pattern observed on the road segment 823 at time epoch 1. Then at time epoch 2 for the same road segment, another traffic speed pattern may be observed (e.g., a speed pattern corresponding to a token B). Accordingly, the tokens A and B can be joined as an observed time series of tokens ("AB") to represent the traffic patterns observed on the road segment 823 over time epochs 1 and 2. Longer sequences can emerge over longer observation times. If the historical sequence AB is commonly observed in the historical traffic data, the "AB" can be a historical token sequence to make a prediction that the next token following an observed token A is likely to be token B. Token dictionaries and historical token sets/sequences can be constructed for any other type of patterns (e.g., weather patterns) for prediction and modeling according to the embodiments described herein.

FIG. 8G is a flowchart of a process for traffic modeling and weather modeling using token-based prediction, according to one embodiment. In step 825, the system 100 associates location data from the GPS probes 827 with map data 829 and then references this information to TMC locations. As described above, in this instance, unique vehicle speeds over the TMC were calculated and collected for 5-minute epochs for 4 years and represented as token sequences. In one embodiment, the system 100 determines that the mean of the unique vehicle average speed for a TMC/epoch is representative of the vehicle population speed. The system 100 then uses this data as "Traffic" data. In step 831, the system 100 uses machine-learning processes to model the roadway speed data. In one embodiment, the system 100 receives the processed GPS probe data as an input. In one embodiment, the system 100 normalizes the data to speed-limit and then clusters "like" Traffic states (or patterns) together, which can be generalized to a model. In one embodiment, the system 100 assigns the patterns back to appropriate TMCs and epochs.

In step 833, the system 100 outputs the clustered Traffic states (or patterns), which is illustrated in FIG. 8H through 8J. In one embodiment, the clustered states or patterns can be represented as respective tokens of the token dictionary of traffic patterns as described above. By way of example, the system 100 determines that the default condition on the study area roadways appears to be "free-flow", and there appears to be little time-dependent cyclical congestion (i.e., rush-hour traffic).

In one instance, the system 100 determined that the most extreme traffic state showed Traffic speeds dropping to as low as 55% of speed limit (e.g., a state that can be represented by a unique token), which can be assumed to occur during the most adverse weather conditions, as depicted in the chart 835 of FIG. 8H. In one embodiment, the weather condition can be a separate pattern represented by a weather token separate and independent from the traffic token. In other embodiments, weather can be a contextual parameter be used to assign different token names to the same traffic pattern. For example, a congested traffic pattern occurring in sunny weather can be represented by a token S, while the same congested traffic pattern occurring in raining weather can be represented by a token T. In particular, the Y-axis of the chart 835 represents pattern speeds as a % of the roadway speed limit. Each pattern (e.g., respectively represented by different tokens) describes an hour-long period in 5-minute epochs (x-axis). In one embodiment, the system 100 assigns the patterns to given epochs for a TMC, as depicted in the chart 837 of FIG. 8I. In this instance, the input Traffic speeds are shown by dots 839, and the associated patterns are layered over the top as lines 841. In one embodiment, the system 100's assignment does not precisely describe the Traffic speed for any given 5-minute epoch, but rather it embodies the Traffic trend over the time period, which helps to remove noise from the data when the system 100 subsequently creates predictive models in the Weather Modeling step. In one embodiment, the system 100 outputs the Traffic states (or patterns) as a percentage of the entire population, as depicted in the chart 843 of FIG. 8J. In this instance, boxes are relative, the bigger the box, the more the Pattern is seen. The slowest speed pattern (block 845) (str-1_c08_d00014) is only seen 0.03% of the time, comparable to less than half a day for all study roadways over the four-year study period.

Returning to FIG. 8G, in step 847, the system 100 performs weather modeling (i.e., predicting the Traffic pattern using only weather data). In one instance, the system 100 determines from various databases that there are five dates with adverse weather conditions during the time period of study (e.g., each weather state represented by different respective tokens). In one embodiment, the system 100 mines and prepares the data from the archives 849 (e.g., Road Weather Information System (RWIS) and National Ocean Atmospheric Administration (NOAA)). This data is presented as a series of dashboards (charts 851 through 859 of FIGS. 8K through 8O, respectively) showing the mean of all roadway speeds over the top of tokens assigned by the Traffic Modeling process 831, followed by total NOAA precipitation, mean temperature, and mean wind speed by day for the study area. In one embodiment, by treating the data as an average by epoch for the entire study area, the system 100 can determine general trends (e.g., the slowest pattern (str1-_c09_d00112 (Box 861 in FIG. 8J) seems to occur after heavy precipitation rather than during; the slowest pattern looks to correlate more with temperatures below 0° C. (33° F.); and high wind speeds might be correlated with a drop in the proportion of patterns which are at or above the speed limit (str-1_c04_d00062 (Box 863 in FIG. 8J) and (str-1_c05_doo165)(Box 865 in FIG. 8J)). These weather and/or related traffic trends can then be represented as a time series of observed tokens (e.g., tokens representing each pattern sequentially over the observed time epochs). In one embodiment, the system 100 plots the entire 4-year archive wherein the slower patterns are highlighted, as depicted in the chart 867 of FIG. 8P. In one embodiment, the system 100 can determine from the chart 867 that the slowest patterns are more prevalent during winder and below freezing-point temp as suggested in the first trend described above, but that the other two general trends are harder to determine from the chart 867. Again, in one embodiment, the token platform 107 can represent these patterns as token sequences arranged in chronological order based on their observation times.

Again referring to FIG. 8G, in step 869, the system 100 employs a machine learning approach (e.g., Random Forest) to model the weather data against the Traffic data. In one embodiment, the system 100 receives data from the four closest RWIS and NOAA stations at a sample TMC location and the system 100 generates a test model to determine the effects of the various weather inputs on Traffic patterns. In particular, one of the outputs of a Random Forest is a measure of the importance of each input predictor variable, as depicted in graphs 871 and 873 of FIG. 8Q. In one embodiment, the system 100 can determine the following key trends: NOAA data appears to be better predictor than RWIS data; mean sea level pressure (MSLP) appears to be a very important predictor; and the closer stations for NOAA and RWIS generally predict traffic state better than further away stations, although the results are variable depending on feature type. Referring to FIG. 8P, sample run variable importance in terms of (graph 871) the average decrease of accuracy if the feature is removed and (graph 873) the average decrease in Gini impurity, which is a measure of the likelihood of the feature leading to a misclassification of the pattern. With respect to both graphs 871 and 873, features near the top of the graphs are more important for the output classification model. With this knowledge, the system 100 can now build a model for the entire four years of Traffic in the study area. In one embodiment, because this is a larger Machine Learning exercise (e.g., over 108 million rows), the system 100 can simplify the model inputs. In one embodiment, the system 100 performs feature engineering with respect to the NOAA station data and RWIS station surface condition data to simplify the model inputs. By way of example, the system 100 can convert RWIS surface conditions "chemical wet," "chemically wet," "frost," "ice warning," "ice watch," and "frost" to "cold & wet roads;" "trace moisture," "wet," "damp," and "dew" to "warm wet roads;" etc.

In one embodiment, the system 100 then uses a machine learning approach (e.g., Random Forest) to determine a predicted pattern or predicted token sequences according to the embodiments described herein.

Returning to FIG. 8G, in step 877, the system 100 determines the pattern prediction accuracy and/or classification accuracy of the model. In one embodiment, the system 100 then outputs the statistics in step 879 assuming that the pattern prediction and/or classification accuracy is within a predetermined suitable range.

The processes described herein for providing next token prediction may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
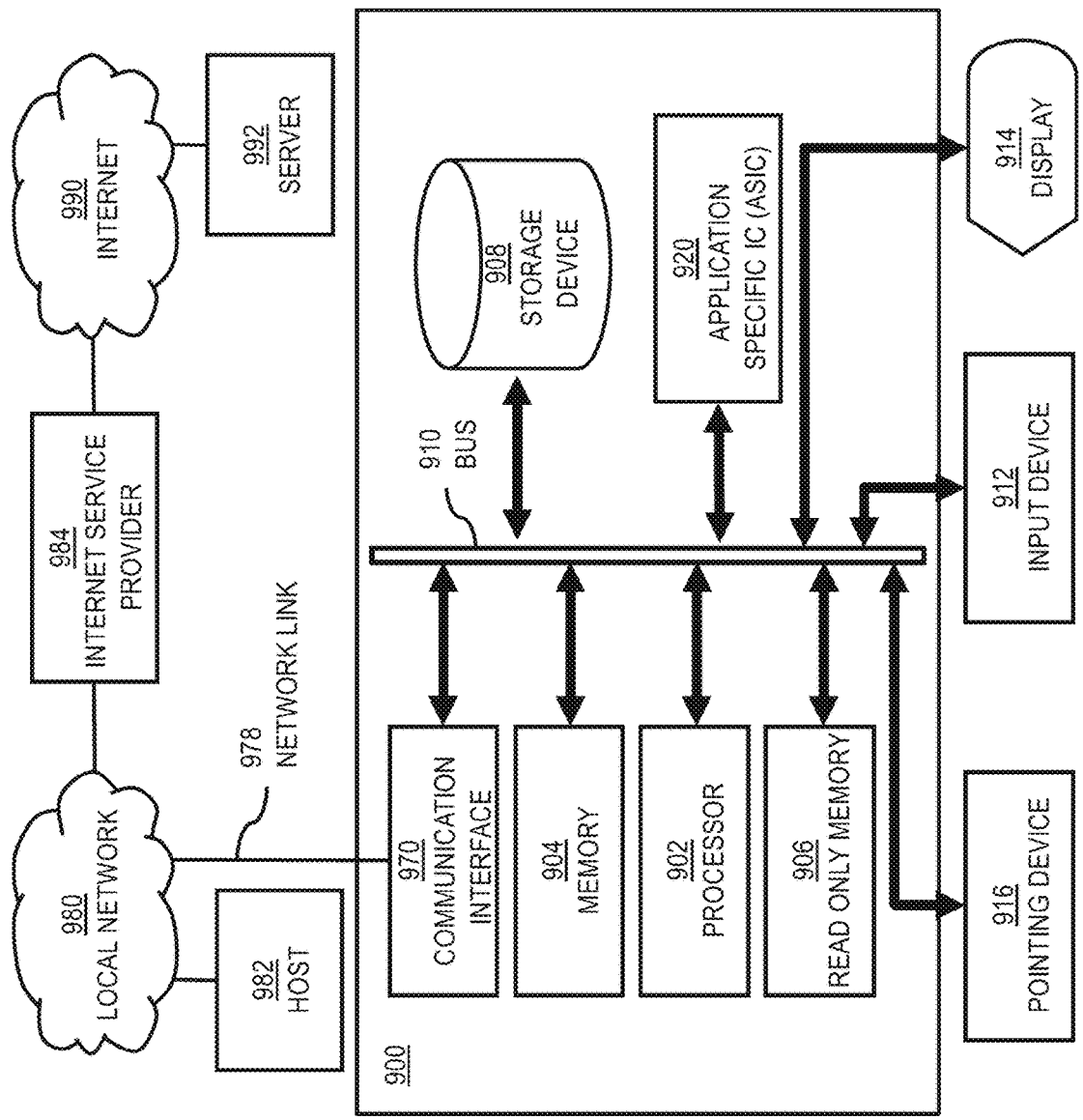
FIG. 9 is a diagram of hardware that can be used to implement an embodiment of the invention.

FIG. 9 illustrates a computer system 900 upon which an embodiment of the invention may be implemented. Computer system 900 is programmed (e.g., via computer program code or instructions) to provide next token prediction as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 910 includes one or more parallel conductors of information so that information is transferred quickly among devices coupled to the bus 910. One or more processors 902 for processing information are coupled with the bus 910.

A processor 902 performs a set of operations on information as specified by computer program code related to providing next token prediction. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or other dynamic storage device, stores information including processor instructions for providing next token prediction. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for providing next token prediction, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT) or a liquid crystal display (LCD), or plasma screen or printer for presenting text or images, and a pointing device 916, such as a mouse or a trackball or cursor direction keys, or motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of application specific ICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 105 for providing next token prediction.

The term computer-readable medium is used herein to refer to any medium that participates in providing information to processor 902, including instructions for execution. Such a medium may take many forms, including, but not limited to, non-volatile media, volatile media and transmission media. Non-volatile media include, for example, optical or magnetic disks, such as storage device 908. Volatile media include, for example, dynamic memory 904. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 10 illustrates a chip set 1000 upon which an embodiment of the invention may be implemented. Chip set 1000 is programmed to provide next token prediction as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to provide next token prediction. The memory 1005 also stores the data associated with or generated by the execution of the inventive steps.

Figure 11:
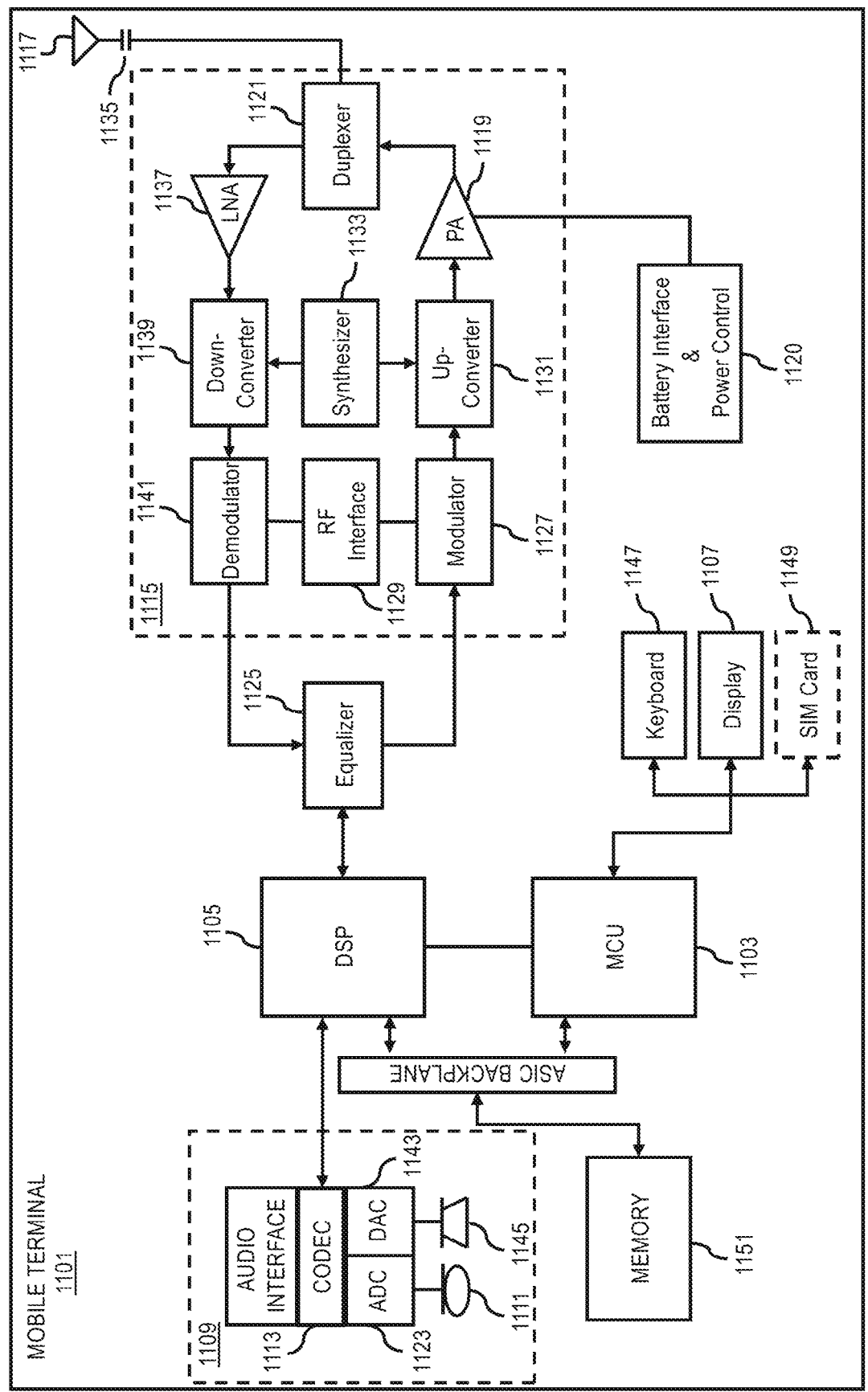
FIG. 11 is a diagram of a mobile terminal (e.g., handset) that can be used to implement an embodiment of the invention.

FIG. 11 is a diagram of exemplary components of a mobile station (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile station functions that offer automatic contact matching. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile station 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103—which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile station 1101 to provide next token prediction. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the station. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile station 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1151 may be, but not limited to, a single memory, CD, DVD, ROM, RAM, EEPROM, optical storage, or any other non-volatile or non-transitory storage medium capable of storing digital data.

An optionally incorporated SIM card 1149 carries, for instance, important information, such as the cellular phone number, the carrier supplying service, subscription details, and security information. The SIM card 1149 serves primarily to identify the mobile station 1101 on a radio network. The card 1149 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer implemented method for traffic navigation comprising:
    receiving, at a computer system comprising a user equipment device, an observed time series of tokens associated with a series of roadways, wherein each of the tokens represents an observed traffic pattern;
    running, at the computer system, a traffic prediction algorithm comprising:
        adding a most recent token from the observed time series of tokens associated with the series of roadways into a variable token set;
        processing a historical token set to determine a historical token sequence comprising the variable token set followed by a next token;
        recursively adding a next most recent token from the observed time series of tokens associated with the series of roadways into the variable token set for processing until the next token following the variable token set in the determined historical token sequence is unique or meets a target number of possible predictions;
    predicting, in response to determining that the next token is unique or meets a target number of possible predictions, traffic pattern of the observed time series of tokens associated with the series of roadways, wherein a model that only comprises and uses past data to render the predicted traffic pattern is utilized at the traffic prediction algorithm; and
    presenting, at the user equipment device, routing information along the series of roadways based on the predicted traffic pattern.

2. The method of claim 1, wherein a minimum density for said each of the tokens is enforced.

3. The method of claim 1, wherein determining that the next token is unique comprises determining that there is only one historical token sequence that includes the variable token set followed by the next token.

4. The method of claim 1, wherein determining that the next token meets a target number of possible predictions comprises:
    determining a count of the historical token sequence and at least one other historical token sequence that include the variable token set followed by the next token or another next token; and
    determining that the count meets the target number of possible predictions.

5. The method of claim 4, wherein no next most recent token remains in the observed time series of tokens to add to the variable token set and the next token in the historical token sequence is not unique or does not meet the target number of possible predictions, the method further comprising:
    removing a last added token from the variable token set; and
    selecting the predicted next token based on the variable token set with the last added token removed.

6. The method of claim 5, further comprising:
    flagging the observed time series of tokens as a possible token sequence to update the historical token set.

7. The method of claim 4, further comprising:
    determining respective occurrence frequencies of the next token and the another next token in the historical token sequence and the at least one other historical token sequence; and
    selecting the predicted next token from among the next token and the another next token based on the respective occurrence frequencies.

8. The method of claim 4, further comprising:
    presenting the next token and the another next token as possible predicted next tokens of the observed time series of tokens.

9. The method of claim 8, further comprising:
    calculating respective probabilities of the next token and the another next token as possible next tokens of the observed time series of tokens,
    wherein the presenting of the next token and the another next token also comprises presenting the respective probabilities.

10. The method of claim 9, further comprising:
selecting the predicted next token from among the next token and the another next token based on the respective probabilities.

11. An apparatus for traffic navigation comprising:
at least one processor; and
at least one memory including computer program code for one or more programs,
the at least one memory and the computer program code configured to, with the at least one processor, cause the apparatus to perform at least the following,
receive an observed time series of tokens associated with a series of roadways, wherein each of the tokens represents an observed traffic pattern;
add a most recent token from the observed time series of tokens associated with the series of roadways into a variable token set;
process a historical token set to determine a historical token sequence comprising the variable token set followed by a next token;
recursively add a next most recent token from the observed time series of tokens associated with the series of roadways into the variable token set for processing until the next token following the variable token set in the determined historical token sequence is unique or meets a target number of possible predictions;
predict, in response to determining that the next token is unique or meets a target number of possible predictions a traffic pattern of the observed time series of tokens associated with the series of roadways, wherein a model that only comprises and uses past data to render the predicted traffic pattern is utilized at a traffic prediction algorithm;
present routing information along the series of roadways based on the predicted traffic pattern.

12. The apparatus of claim 11, wherein the apparatus is further caused, with respect to determining that the next token meets a target number of possible predictions, to:
determine a count of the historical token sequence and at least one other historical token sequence that include the variable token set followed by the next token or another next token; and
determine that the count meets the target number of possible predictions.

13. The apparatus of claim 12, wherein no next most recent token remains in the observed time series of tokens to add to the variable token set and the next token in the historical token sequence is not unique or does not meet the target number of possible predictions, the apparatus is further caused to:
remove a last added token from the variable token set; and
select the predicted next token based on the variable token set with the last added token removed.

14. The apparatus of claim 12, wherein the apparatus is further caused to:
determine respective occurrence frequencies of the next token and the another next token in the historical token sequence and the at least one other historical token sequence; and
select the predicted next token from among the next token and the another next token based on the respective occurrence frequencies.

15. The apparatus of claim 12, wherein the apparatus is further caused to:
present the next token and the another next token as possible predicted next tokens of the observed time series of tokens.

16. A non-transitory computer-readable storage medium for traffic navigation, carrying one or more sequences of one or more instructions which, when executed by one or more processors, cause an apparatus to at least perform the following steps:
receiving an observed time series of tokens associated with a series of roadways, wherein each of the tokens represents an observed traffic pattern;
adding a most recent token from the observed time series of tokens associated with the series of roadways into a variable token set;
processing a historical token set to determine a historical token sequence comprising the variable token set followed by a next token;
recursively adding a next most recent token from the observed time series of tokens associated with the series of roadways into the variable token set for processing until the next token following the variable token set in the determined historical token sequence is unique or meets a target number of possible predictions;
predicting, in response to determining that the next token is unique or meets a target number of possible predictions, a traffic pattern of the observed time series of tokens associated with the series of roadways, wherein a model that only comprises and uses past data to render the predicted traffic pattern is utilized at a traffic prediction algorithm; and
presenting routing information along the series of roadways based on the predicted traffic pattern.

17. The non-transitory computer-readable storage medium of claim 16,
wherein the apparatus is further caused, with respect to determining that the next token meets a target number of possible predictions, to perform:
determining a count of the historical token sequence and at least one other historical token sequence that include the variable token set followed by the next token or another next token; and
determining that the count meets the target number of possible predictions.

18. The non-transitory computer-readable storage medium of claim 17, wherein no next most recent token remains in the observed time series of tokens to add to the variable token set and the next token in the historical token sequence is not unique or does not meet the target number of possible predictions, the apparatus is further caused to perform:
removing a last added token from the variable token set; and
selecting the predicted next token based on the variable token set with the last added token removed.

19. The non-transitory computer-readable storage medium of claim 17, wherein the apparatus is further caused to perform:
determining respective occurrence frequencies of the next token and the another next token in the historical token sequence and the at least one other historical token sequence; and
selecting the predicted next token from among the next token and the another next token based on the respective occurrence frequencies.

20. The non-transitory computer-readable storage medium of claim 17, wherein the apparatus is further caused to perform:

presenting the next token and the another next token as possible predicted next tokens of the observed time series of tokens.

\* \* \* \* \*